(12) United States Patent
Minamitani et al.

(10) Patent No.: US 7,992,435 B2
(45) Date of Patent: Aug. 9, 2011

(54) AIR FLOW METER

(75) Inventors: Rintaro Minamitani, Tsukuba (JP); Keiji Hanzawa, Mito (JP); Akio Yasukawa, Kashiwa (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 203 days.

(21) Appl. No.: 12/512,512

(22) Filed: Jul. 30, 2009

(65) Prior Publication Data
US 2010/0077851 A1 Apr. 1, 2010

(30) Foreign Application Priority Data
Sep. 30, 2008 (JP) ................................. 2008-252128

(51) Int. Cl.
*G01F 1/68* (2006.01)
(52) U.S. Cl. .................................................. 73/204.26
(58) Field of Classification Search ........................ None
See application file for complete search history.

(56) References Cited

U.S. PATENT DOCUMENTS

| | | | |
|---|---|---|---|
| 6,470,742 B1 * | 10/2002 | Yamakawa et al. | 73/204.26 |
| 2008/0047341 A1 * | 2/2008 | Kanamaru et al. | 73/204.26 |
| 2010/0077851 A1 * | 4/2010 | Minamitani et al. | 73/204.26 |

FOREIGN PATENT DOCUMENTS

| | | |
|---|---|---|
| EP | 1 628 117 A1 | 2/2006 |
| JP | 83-092042 | 4/1988 |
| JP | 10-311760 A | 11/1998 |
| JP | 2001050787 A * | 2/2001 |
| JP | 2002-14070 A | 1/2002 |
| JP | 2003-021547 | 1/2003 |
| JP | 3610484 B2 | 10/2004 |
| JP | 2008-26206 A | 2/2008 |
| WO | WO 03/076878 A1 | 9/2003 |

OTHER PUBLICATIONS

European Search Report dated Feb. 4, 2010 (Three (3) pages).
Japanese Office Action dated Aug. 3, 2010 and translation thereof (Seven (7) pages).

* cited by examiner

*Primary Examiner* — Harshad Patel
(74) *Attorney, Agent, or Firm* — Crowell & Moring LLP

(57) ABSTRACT

In a structure in which peripheral part of a diaphragm section of an electrical insulating film is covered with a protective film made of an organic material, the resistor wire on the diaphragm section crosses the peripheral part of the diaphragm section. At a place where a narrow wire of a resistance temperature detector and the like crosses the peripheral part of the diaphragm section, the protective film is thinner than the other part, and the dust impact resistance is reduced. At a place where a heating resistor wire connected to a heating resistor body or resistance temperature detector wires connected to resistance temperature detector bodies cross a periphery of the diaphragm section, a film component protruding from an electrical insulating film is arranged side by side with the heating resistor wire or the resistance temperature detector wires.

10 Claims, 21 Drawing Sheets

Distance from peripheral part (a)

(b)

AIR FLOW METER

BACKGROUND OF THE INVENTION

1. Field of the Invention

The present invention relates to an air flow meter and more specifically, relates to a thermal air flow meter.

2. Description of the Related Art

As air flow meters, thermal air flow meters are becoming the mainstream because the thermal air flow meters can directly detect mass airflow. Especially thermal air flow meters including measuring elements manufactured by use of a semiconductor micromachining technique are attracting attention because of low cost and low-power drive thereof. Such thermal air flow meters are proposed in Japanese Patent Application Publication No. 10-311750 and the like. A measuring element of the thermal air flow meter proposed in Japanese Patent Application Publication No. 10-311750 includes: a semiconductor substrate; an electrical insulating film formed on the semiconductor substrate; and a plurality of resistors extending in parallel to each other on the electrical insulating film. In the measuring element, a cavity is formed by removing a part of the semiconductor substrate corresponding to a region, in which the resistors are formed, on the electrical insulating film.

In the measuring element of the thermal air flow meter as proposed in Japanese Patent Application Publication No. 10-311750, the cavity is formed by removing the part of the semiconductor substrate corresponding to the region in which the resistors are formed. Accordingly, the part of the electrical insulating film corresponding to the cavity has a diaphragm shape, both sides of which are directly exposed to an air flow containing dust. Furthermore, the electrical insulating film is made of a brittle non-organic material, for example, such as silicon dioxide ($SiO_2$). Accordingly, if solid particles such as sand, salt, and other dust are contained in air which is to be subjected to the flow rate measurement and hit the diaphragm section of the electrical insulating film, the electrical insulating film, that is, the measuring element is damaged. This sometimes disables the flow rate measurement, requiring consideration for reliability of the air flow meter.

In a measuring element of a thermal air flow meter proposed in Japanese Patent No. 3610484, therefore, the peripheral part of the diaphragm section of the electrical insulating film is covered with a protective film made of an organic material, and the protective film is not formed in a region of the diaphragm section of the electrical insulating film where the bodies of the resistors are formed.

SUMMARY OF THE INVENTION

In one of the structures where the peripheral part of the diaphragm section of the electrical insulating film is covered with the protective film made of an organic material, wires of the resistors on the diaphragm section cross the peripheral part of the diaphragm section. It has become clear that dust impact resistance is reduced at the place where narrow wires of the resistance temperature detectors and the like cross the peripheral part of the diaphragm section. It has been found that such reduction of dust impact resistance is caused because part of the protective film formed on the narrow wires is thinner than the other part and can absorb lower kinetic energy of dust.

On the other hand, at the place where the narrow wires of the resistance temperature detectors and the like cross the peripheral part of the diaphragm section, it has become clear that deflection occurs in the diaphragm section if the thickness of the protective film is made excessively thick in order to increase the dust kinetic energy that the protective film can absorb. It has been found that such deflection occurs because as the protective film gets thicker, tension due to the stress generated during formation of the protective film increases.

In the structure where the peripheral part of the diaphragm section of the electrical insulating film is covered with the protective film made of an organic material, it has been found that if the bodies of the resistance temperature detectors, that is, thermo-sensor sections are covered with the protective film, the characteristic of each resistance temperature detector is degraded, thus making it difficult to measure accurate flow rate.

An object of the present invention is to provide a highly reliable thermal air flow meter in which the dust kinetic energy, that is, deformation energy that can be absorbed by a protective film provided for a measuring element is prevented from lowering To achieve the aforementioned object, a thermal air flow meter of the present invention includes: a semiconductor substrate; an electrical insulating film formed on the semiconductor substrate; and a heating resistor and a resistance temperature detector formed on the electrical insulating film. In the thermal air flow meter, the semiconductor substrate is partially removed to form a cavity in a region of the semiconductor substrate where bodies of the heating resistor and resistance temperature detector are formed, and thus the region having the heating resistor body and the resistance temperature detector body formed therein is formed into a diaphragm section. Moreover, a protective film is formed on and outside a peripheral part of the diaphragm section, and is not formed in a region of the diaphragm section where the heating resistor body and the resistance temperature detector body are formed. Moreover, at a place where a heating resistor wire connected to the heating resistor body or a resistance temperature detector wire connected to the resistance temperature detector body crosses the peripheral part of the diaphragm section, a film component protruding from the electrical insulating film is arranged side by side with the heating resistor wire or with the resistance temperature detector wire.

At this time, preferably, the film component is a wire which is made of a same material as that of the heating resistor wire or of the resistance temperature detector wire and which is not electrically connected.

Preferably, width of the wire which is arranged side by side with the heating resistor wire or with the resistance temperature detector wire and which is not electrically connected is wider than width of the heating resistor wire or of the resistance temperature detector wire adjacent to the wire.

Preferably, wires not electrically connected are formed on at least one of sides of the diaphragm section, the at least one side including the place where the heating resistor wire or the resistance temperature detector wire crosses the peripheral part of the diaphragm section, the wires not electrically connected being formed entirely on the at least one side excluding part where at least the heating resistor wire and the resistance temperature detector wire are formed.

Preferably, the wire not electrically connected is formed to diagonally cross the peripheral part of the diaphragm section.

Preferably, outside a periphery of the diaphragm section in a region where the protective film is formed, a slit is formed in the protective film along the periphery of the diaphragm section.

Preferably, outside a periphery of the diaphragm section in a region where the protective film is formed, a narrow wire not electrically connected is formed along the periphery of the diaphragm section.

To achieve the aforementioned object, a thermal air flow meter of the present invention includes: a semiconductor substrate; an electrical insulating film formed on the semiconductor substrate; and a heating resistor and a resistance temperature detector formed on the electrical insulating film. In the thermal air flow meter, the semiconductor substrate is partially removed to form a cavity in a region of the semiconductor substrate where bodies of the heating resistor and resistance temperature detector are formed, and thus the region having the heating resistor body and the resistance temperature detector body formed therein is formed into a diaphragm section. Moreover, a protective film is formed on and outside a peripheral part of the diaphragm section, and is not formed in a region of the diaphragm section where the heating resistor body and the resistance temperature detector body are formed, and at a place where a resistance temperature detector wire connected to the resistance temperature detector body crosses the peripheral part of the diaphragm section, width of the resistance temperature detector wire is wider than the other part of the resistance temperature detector wire.

To achieve the object of the present invention, a thermal air flow meter of the present invention includes: a semiconductor substrate; an electrical insulating film formed on the semiconductor substrate; and a heating resistor and a resistance temperature detector formed on the electrical insulating film. In the thermal air flow meter, the semiconductor substrate is partially removed to form a cavity in a region of the semiconductor substrate where bodies of the heating resistor and resistance temperature detector are formed, and thus the region having the heating resistor body and the resistance temperature detector body formed therein is formed into a diaphragm section. Moreover, a protective film is formed on and outside a peripheral part of the diaphragm section, and is not formed in a region of the diaphragm section where the heating resistor body and the resistance temperature detector body are formed, and at a place where a heating resistor wire connected to the heating resistor body or a resistance temperature detector wire connected to the resistance temperature detector body crosses the periphery of the diaphragm section, the heating resistor wire or the resistance temperature detector wire is formed diagonally to the periphery of the diaphragm section.

To achieve the aforementioned object, a thermal air flow meter of the present invention includes: a semiconductor substrate; an electrical insulating film formed on the semiconductor substrate; and a heating resistor and a resistance temperature detector formed on the electrical insulating film. In the thermal air flow meter, the semiconductor substrate is partially removed to form a cavity in a region of the semiconductor substrate where bodies of the heating resistor and resistance temperature detector are formed, and thus the region having the heating resistor body and the resistance temperature detector body formed therein is formed into a diaphragm section. Moreover, a protective film is formed to extend from outside the diaphragm section across a periphery of the diaphragm section to inside the diaphragm section, and is not formed in a region of the diaphragm section where the heating resistor body and the resistance temperature detector body are formed, and length from the periphery of the diaphragm section to the end of the protective film which is formed within the diaphragm section is set so that a minimum value of deformation energy in a region where the protective film of the diaphragm section is not formed is more than a minimum value of the deformation energy in the peripheral part of the diaphragm section where the protective film is formed.

According to the present invention, it is possible to prevent the diaphragm from being broken by impact of dust particles to increase the reliability of the measuring element of the thermal air flow meter. This makes it possible to provide a highly reliable thermal air flow meter.

BRIEF DESCRIPTION OF THE DRAWINGS

FIG. 1A showing a schematic plan view; and FIG. 1B showing an enlarged cross-sectional view along a line A-A of FIG. 1A.

EXPLANATION OF REFERENCE NUMERALS

1 . . . measuring element, 2 . . . semiconductor substrate, 3 . . . electrical insulating film, 4 . . . heating resistor body, 4' . . . heating resistor body wire, 5 . . . resistance temperature detector body, 5a . . . upstream resistance temperature detector body, 5a' . . . upstream resistance temperature detector wire, 5b . . . downstream resistance temperature detector body, 5b' . . . downstream resistance temperature detector wire, 6 . . . protective film, 7 . . . narrow wire, 8 . . . wide wire, 9 . . . varnish flow, 10 . . . film forming stress, 11 . . . dummy wide wire, 12 . . . slit, 20 . . . supporter, 21 . . . external circuit, 22 . . . intake passage, 23 . . . sub-passage, 29 . . . cavity, 30 . . . diaphragm section, 40 . . . air flow, 45 . . . solid particles

DESCRIPTION OF THE PREFERRED EMBODIMENTS

Description will be given below with regard to a thermal air flow meter to which the present invention is applied.

First Embodiment

Figure 1A:
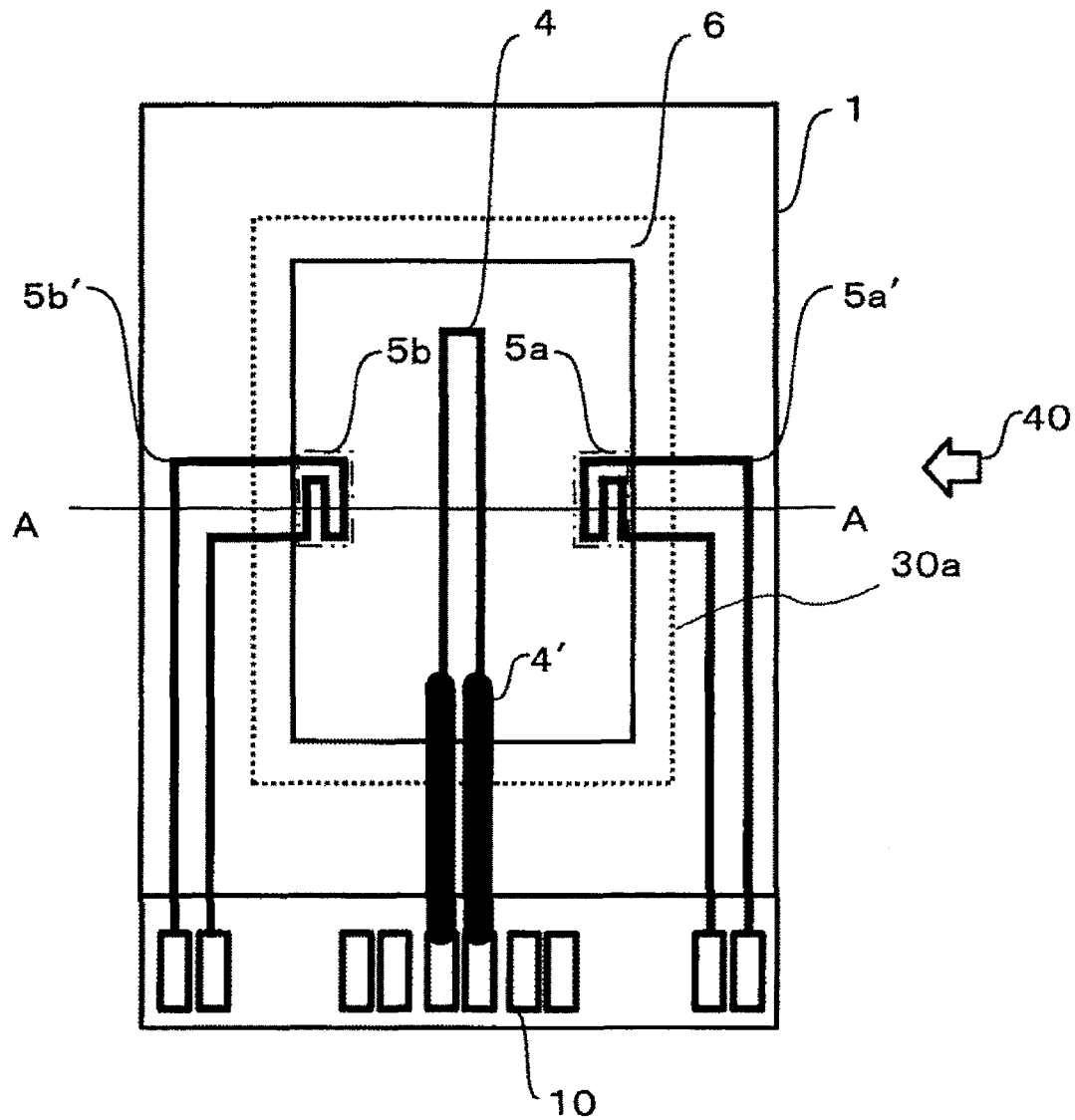
FIGS. 1A and 1B are views illustrating an embodiment of a measuring element provided for a thermal air flow meter.
Figure 1B:
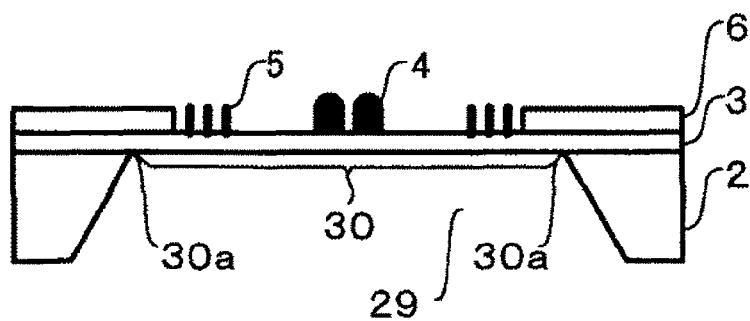

FIG. 1A is a schematic plan view of a measuring element of the thermal air flow meter, and FIG. 1B is an enlarged cross-sectional view taken along a line A-A of FIG. 1A. As shown in FIG. 1A, a measuring element 1 provided for the thermal air flow meter of this embodiment includes: a semiconductor substrate 2; an electrical insulating film 3; a heating resistor body 4; a resistance temperature detector body 5 measuring temperature of the heating resistor body 4, and a protective film 6 protecting the electrical insulating film 3. The electrical insulating film 3 formed on the semiconductor substrate 2 composed of single-crystalline silicon or the like is a film having electrical and heat insulation, for example such as silicon dioxide ($SiO_2$) film and a silicon dioxide film reinforced by a silicon nitride ($Si_3N_4$) film. On the electrical insulating film 3, the heating resistor body 4, resistance temperature detector body 5, and the like are formed, which are composed of semiconductor materials, for example, such as polycrystalline silicon, germanium, gallium arsenide, tantalum, molybdenum, and platinum.

The resistance temperature detector body 5 includes a resistance temperature detector body 5a on the upstream side of the heating resistor body 4 with respect to an air flow 40 (hereinafter, referred to as an upstream resistance temperature detector body 5a) and a resistance temperature detector body 5b on the downstream side of the heating resistor body 4 (hereinafter, referred to as a downstream resistance temperature detector body 5b), which are extended in parallel to each other. The resistance temperature detector bodies 5a and 5b are symmetrically formed with the heating resistor body 4 interposed therebetween. Each of the heating resistor body 4 and resistance temperature detector body 5 may be repeatedly folded in alternating directions. The structure of the heating resistor 4 and resistance temperature detector bodies 5a and 5b depends on the measurement method, and just an example thereof is shown herein. The both ends of the heating resistor body 4 are electrically connected through wires 4' to terminal electrodes 10 formed on the edge of the measuring element 1. The heating resistor body 4 means a heating resistor excluding the terminal electrodes 10 and wire 4', and the resistance temperature detector body 5 means bodies of a resistance temperature detector excluding the terminal electrodes 10 and wires 5a' and 5b'. Each of the terminal electrodes 10 is formed by plating or deposition of a conductive material such as gold and aluminum.

Part of the semiconductor substrate 2 corresponding to a region of the electrical insulating film 3 where the heating resistor body 4 and resistance temperature detector body 5 are formed is removed up to the interfacial boundary between the semiconductor substrate 2 and electrical insulating film 3 by anisotropic etching to form a cavity 29 for heat insulation of the heating resistor body 4. Both sides of a diaphragm section 30 which is a part of the electrical insulating film 3 corresponding to the cavity 29 are directly exposed to the environment.

The protective film 6 is a soft film having electrical insulation, for example, such as a film made of an organic material and covers the electrical insulating film 3 from a region corresponding to a peripheral part of the cavity 29 (a little inside of the peripheral part) to the outside of the peripheral part. Herein, a periphery of the cavity 29 corresponds to a periphery 30a of the diaphragm section 30. The protective film 6 is not formed on the heating resistor body 4 because the protective film 6 is deteriorated by high temperature. The protective film 6 is not formed on the resistance temperature detector body 5 because of degradation of the heat insulation and sensor characteristics. Moreover, on a part of the electrical insulating film 3 at an end of the semiconductor device 1 where the terminal electrodes 10 are formed, the protective film 6 is not formed because electrical connection is made. In other words, the protective film 6 covers the electrical insulating film 3 excluding the part within the peripheral part of the cavity 29 where the heating resistor body 4 and resistance temperature detector body 5 are formed and the part where the terminal electrodes 10 are formed.

Figure 2:
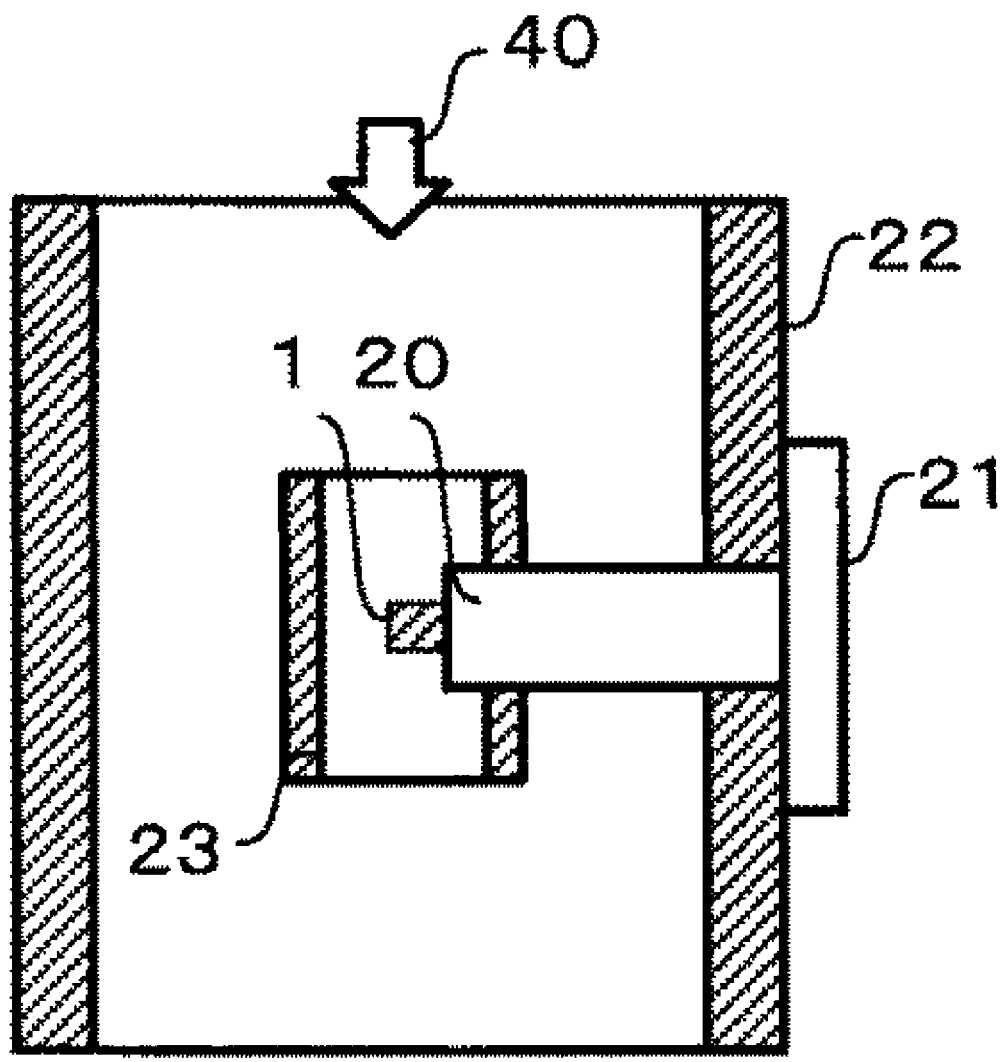
FIG. 2 is a view showing a schematic structure of the embodiment of the thermal air flow meter.

The thermal air flow meter of this embodiment includes a supporter 20 supporting the measuring element 1, an external circuit 21, and the like as shown in FIG. 2. The measuring element 1 and external circuit 21 are electrically connected to each other through not-shown wires protected by the supporter 20 between the terminal electrodes 10 of the measuring element 1 and the external circuit 21. The measuring element 1 is placed within a sub-passage 23 provided within an intake passage 22 of an electronically-controlled fuel injection system, and the external circuit 21 is placed on an outer wall of the intake passage 22.

In flow rate measurement by the thermal air flow meter of this embodiment, heating current is flown through the heating resistor body 4 so that temperature of the resistance temperature detector body 5 measuring the temperature of the heating resistor body 4 is a certain degree higher than temperature of a resistance temperature detector for air (not shown herein) which measures the temperature of the air flow 40. At this time, the temperatures of the heating resistor body 4 symmetrically formed with respect to the resistance temperature detector body 5, that is, the respective resistance values corresponding to the temperatures are compared so that the direction of the air flow 40 can be detected. For example, if the air flow is zero, the temperature of the upstream resistance temperature detector body 5a is equal to that of the downstream resistance temperature detector body 5b. In the case of a forward flow in the direction of the air flow 40 shown in FIG. 1, the cooling effect of the air flow 40 on the upstream resistance temperature detector body 5a is larger than that on the downstream resistance temperature detector body 5b, and the downstream resistance temperature detector body 5b is therefore hotter than the upstream resistance temperature detector body 5a. In the case of a backward flow, the upstream resistance temperature detector body 5a is hotter than the downstream resistance temperature detector body 5b. By comparing the temperatures of the resistance temperature detector bodies, that is, the resistance values corresponding to the temperatures as described above, the flow rate and direction of the air flow 40 can be detected. The resistance values of the resistance temperature detector bodies 5a and 5b are calculated from inter-electrode voltages of the terminal electrodes 10. The air flow rate is calculated from the value of the heating current which is flown through the heating resistor body 4 in order to perform control so that the measured temperatures of the resistance temperature detector bodies 5a and 5b are a certain degree higher than the measured temperature of the air temperature resistance temperature detector.

Herein, the heating current flows through the heating resistor body 4 formed on the electrical insulating film 3 as described above, and the heating resistor body 4 is therefore heated to 200 to 300° C. In addition to the heating resistor body 4, the electrical insulating film 3, resistance temperature detector bodies 5a and 5b, and the like are exposed to high temperature. Accordingly, the organic material of the protective film 6 should be a material which has high heat deformation or denaturation temperature and high continuous operating temperature and which can be employed in a manufacturing process by the semiconductor micromachining technique. Known examples thereof include thermosetting resin, such as polyimide.

The electronically controlled fuel injection system of internal combustion engines of automobiles and the like sucks outside air, and the air as an object for flow rate measurement contains solid particles of sand, salt, and other dust. The internal combustion engine of automobiles and the like is usually provided with an air filter with a mesh size of 15 μm to remove such particles in the sucked outside air. Although particles with a size of more than about 15 μm are removed by the air filter, particles with a size of about 15 μm or less pass through the air filter and sometimes directly hit the measuring element 1 of the thermal air flow meter. Accordingly, only with the electrical insulting film 3 made of silicon dioxide or the like, which is a brittle inorganic material, the kinetic energy of the hitting particles cannot be absorbed by deformation of the diaphragm section 30, and local stress occurs at the places that the particles hit, thus breaking the electrical insulating film 3 in some cases. In other words, if the kinetic energy of the particles is larger than the deformation energy of the diaphragm section 30 of the electrical insulating film 3, or maximum energy which can be absorbed by the diaphragm section 30, the diaphragm section 30 is broken.

The film composed of polyimide, which is a soft organic material, has a higher energy absorption capability than that of a film made of silicon dioxide. In the measuring element 1 including the protective film 6 made of polyimide, therefore, the impact energy of particles can be absorbed by not only deformation of the diaphragm section 30 but also the protective film 6. It is therefore possible to prevent the electrical insulating film 3, or the measuring element 1, from being broken by impact of particles.

Figure 3A:
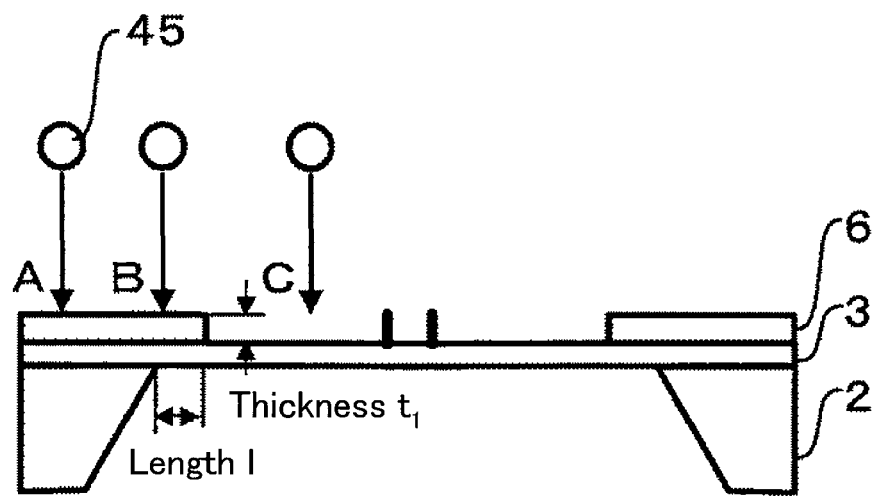
FIGS. 3A and 3B are views showing a breaking mechanism of an electrical insulating film due to impact of particles.
Figure 3B:
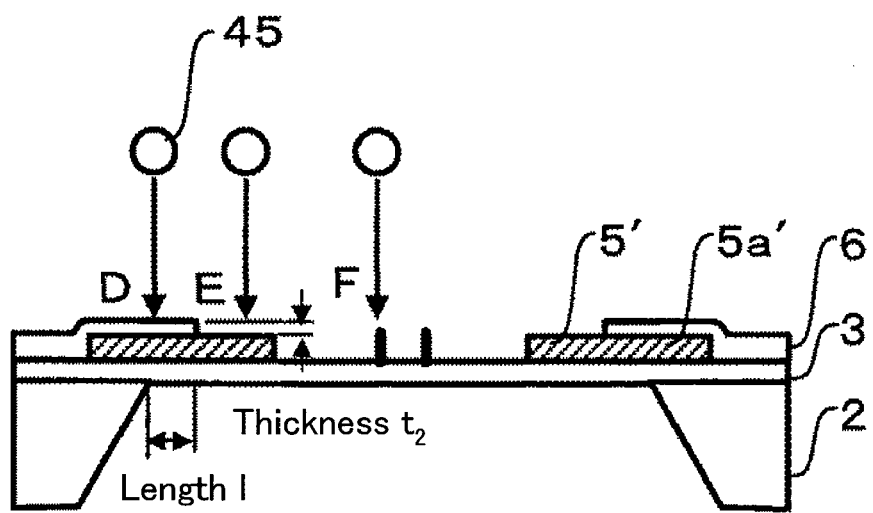
Figure 4A:
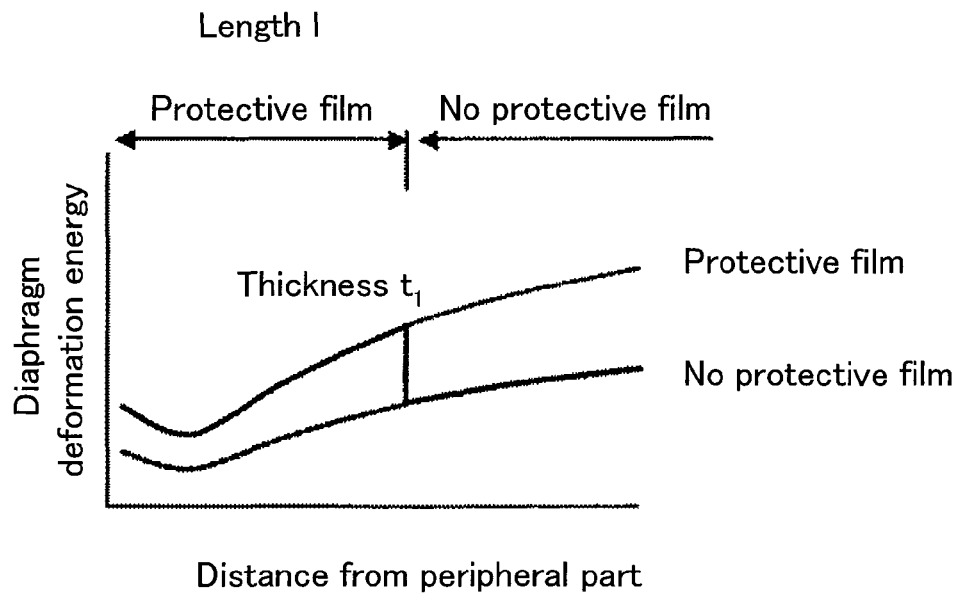
FIGS. 4A and 4B are views showing absorbed energy of a diaphragm and distance from a periphery of the diaphragm.
Figure 4B:
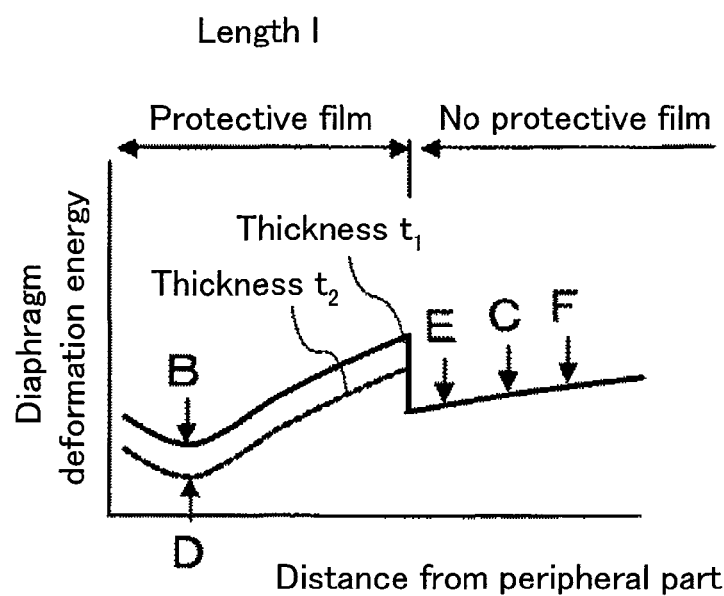

As shown in FIGS. 3A and 3B, positions on the measuring element 1 where particles 45 hit are separated into six types of impact positions A to F. The impact position A is on a part of the protective film 6 on the electrical insulating film 3 corresponding to the semiconductor substrate 2. The impact position B is on a part of the protective film 6 on the electrical insulating film 3 corresponding to the periphery of the cavity 29, that is, on a part of the protective film 6 of the periphery of the diaphragm section 30. The impact position C is on a central part of the electrical insulating film 3 corresponding to the central part of the cavity 29, that is, a central part of the diaphragm section 30. The impact position D is on a part of the protective film 6 covering narrow wires of the resistance temperature detector bodies 5a and 5b and the like around the periphery of the diaphragm section 30. The impact position E is on the wires in the central part of the diaphragm section 30. The impact position F is on the central part of the electrical insulating film 3 corresponding to the central part of the cavity 29, that is, a central part of the diaphragm section 30, which is the same as the impact position C. The peripheral part of the cavity 29 and the peripheral part of the diaphragm section 30 includes the periphery of the cavity 29, the periphery 30a of the diaphragm section 30 and neighboring part thereof. FIGS. 4A and 4B show the deformation energy (i.e. absorption energy) of the diaphragm section 30 in the case where the particles 45 hit the diaphragm section 30 of the electrical insulating film 3. The closer the impact position of the particles 45 is to the peripheral part of the diaphragm section 30, that is, a part around the boundary between the substrate 2 and cavity 29, the smaller the deformation energy is. On the boundary line between the same, the deformation energy is increased because of the influence of the semiconductor substrate 2. As shown in FIG. 4A, the deformation energy of the diaphragm section 30 exhibits different trends in the presence and absence of the protective film 6 (shown by graphs with the protective film and without protective film in the drawing). At the part around the boundary of the protective film 6, the graph with the protective film transits to that without the protective film. In FIG. 4, the deformation energy increases near a distance of 0 from the outer end. This is because some of dust particles hit the semiconductor substrate 2 outside of the diaphragm section 30 and the semiconductor substrate 2 bears a part of the impact energy.

The impact position A is above the semiconductor substrate 2 and does not contribute to break of the diaphragm section 30. As shown in FIG. 4B, the deformation energy at the impact position B is deformation energy with the protective film, and the deformation energy at the impact position C is deformation energy without the protective film. The damage due to impact of the particles 45 is more likely to occur at the peripheral part of the diaphragm section 30 restricted by the semiconductor substrate 2, that is, in the vicinity of the impact position B, than in the vicinity of the impact position C, that is, in the central part of the diaphragm section 30. Since the deformation energy in the central part of the diaphragm section 30 is larger than the kinetic energy of the particles 45, the diaphragm section 30 is less likely to be broken by the impact of the particles 45 onto the vicinity of the impact position C even when the protective film 6 is not formed on the central part of the diaphragm section 30. Accordingly, the protective film 6 made of polyimide is formed so as to cover the electrical insulating film 3 outside of the periphery of the diaphragm section 30, where the deformation energy of the diaphragm section 30 is smaller than the kinetic energy of the particles 45, thus preventing the diaphragm section 30 of the electrical insulating film 3 from being broken by impact of the particles 45. On the peripheral part of the diaphragm section 30 where the resistance temperature detector wires 5a' and 5b' are provided, that is, at the impact position D, the protective film 6 is thin, and the deformation energy is a deformation energy with a protective film of thickness $t_2$ indicated by a dotted line in FIG. 4B. The deformation energy at the impact position D is smaller than that of the peripheral part of the diaphragm section 30 in which there is no resistance temperature detector. The deformation energies at the impact positions E and F where there is no protective film 6 are equal to the deformation energy at the impact position C. Since the resistance temperature detector is narrow wire, the deformation energy of the diaphragm section 30 is little affected by the presence of the resistance temperature detector.

Figure 5A:
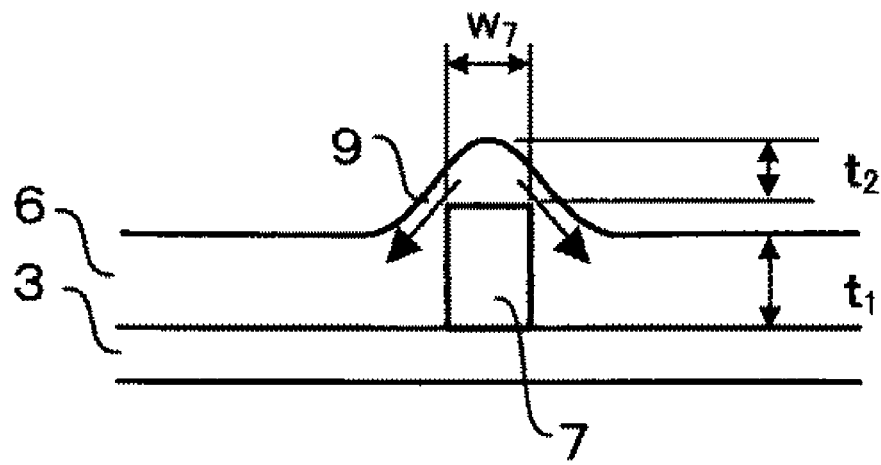
FIGS. 5A and 5B are views illustrating an influence of wire width on thickness of a protective film.
Figure 5B:
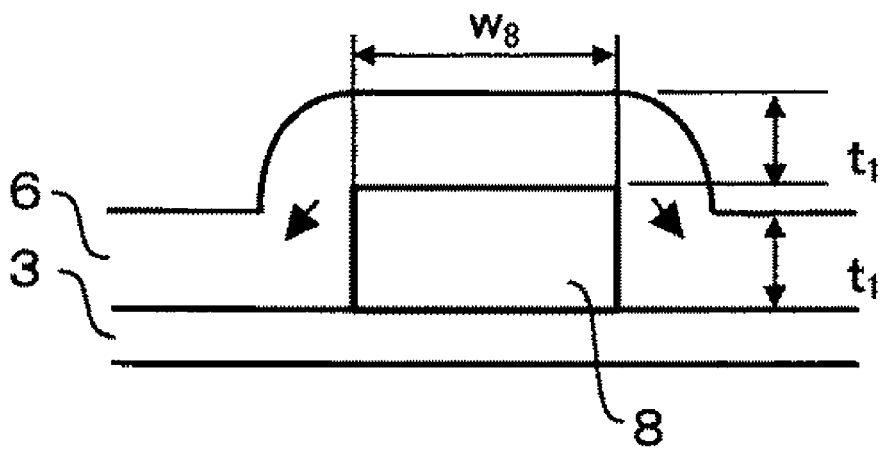

The protective film 6 is formed by applying varnish by spin coating and heating for dehydration condensation. As shown in FIG. 5A, in the case of a narrow wire 7 (wire width: $W_7$) such as the resistance temperature detector wires 5a' and 5b', varnish with low viscosity flows down from the top of the wire 7 and becomes thin on the narrow wire 7 to a thickness t2. As shown in FIG. 5B, by employing a wide wire 8 (wire width: $W_8$, $W_8 > W_7$), it is possible to prevent varnish from flowing down from the top of the wire and maintain the thickness of the protective film 6 on wires equal to the thickness $t_1$ of a part where there is no wire. Preferably, the width of the wide wire is, for example, five or more times larger than the thickness of the protective film 6.

By increasing the thickness of the protective film 6, the resistance to dust of the diaphragm section 30 can be enhanced. The kinetic energy of the dust can be calculated by determining the size and the speed of the dusts as design specifications as described above. As shown in FIGS. 4a and 4b, the place with the minimum deformation energy is a place in the peripheral part of the diaphragm section 30 where the resistance temperature detector is provided. Accordingly, as shown in FIG. 6A, the thickness of the protective film 6 needs to be set to not less than a film thickness $t_b$. The film thickness $t_b$ is such that the deformation energy at the place in the peripheral part of the diaphragm section 30 where the resistance temperature detector wires 5a' and 5b' are provided is larger than the kinetic energy of the dust. The minimum thickness of the protective film 6 can be thus determined. Moreover, the increase in thickness of the protective film 6 creates issues of deflection of the diaphragm section 30 due to film forming stress of the protective film 6 and degradation of the sensor characteristics because of the reduction in heat insulation due to the thermal conductivity of the protective film 6. Accordingly, it is preferable that the protective film 6 is made thick without being affected by such issues.

On the other hand, by increasing the length of the protective film 6 from the periphery 30a, the resistance to dust of the diaphragm section 30 can be enhanced. As previously described, the minimum deformation energy corresponding to the kinetic energy of dust particles is set as the design specification. As shown in FIG. 4B, the graph of the deformation energy in the presence of the protective film transits to the graph of the deformation energy in the absence of the protective film at the boundary of the protective film 6. The deformation energy at the transition point is the minimum value in the region without the protective film. Accordingly, as shown in FIG. 6(b), it is preferable that the length from the periphery 30a is set not less than $l_1$ so that the minimum value of the deformation energy in a region within the peripheral part of the diaphragm section 30 of the electrical insulating film 3 where the protective film 6 is not formed and where the heating resistor and resistance temperature detector are formed is more than the minimum value of the deformation energy at the protective film 6 formed on the peripheral part of the diaphragm section 30. Since the resistance to dust of the diaphragm section 30 is determined by the minimum value of the deformation energy, further increasing the length of the protective film 6 to more than the length has no effect. Furthermore, if the length of the protective film 6 is excessively increased, the protective film 6 covers the resistance temperature detector bodies 5a and 5b. This reduces the thermal insulation and degrades the sensor characteristics. Moreover, the protective film 6 is provided closer to the heating resistor body 4. Accordingly, the excessively increased length is not preferable in the light of the heatproof temperature of the protective film 6.

In this embodiment, the protective film 6 is formed from the outside of the diaphragm section 30 up to the inside of the diaphragm section 30 across the periphery 30a of the diaphragm section 30 and is not formed in the region of the diaphragm section 30 where the heating resistor body 4 and resistance temperature detector bodies 5a and 5b are formed. Moreover, the length between the periphery 30a of the diaphragm section 30 and the edge of the protective film 6 formed within the diaphragm section 30 is set so that the minimum value of the deformation energy in the region of the diaphragm section 30 where the protective film 6 is not formed is more than the minimum value of the deformation energy at the peripheral part of the diaphragm section 30 where the protective film 6 is formed.

Figure 6:
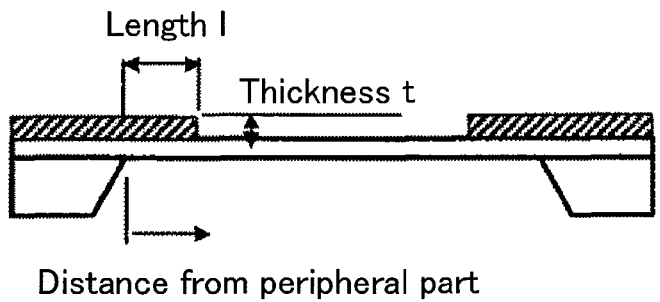
FIG. 6 is a view showing a relationship between deformation energy of the diaphragm and thickness and distance of the protective film.
Figure 6:
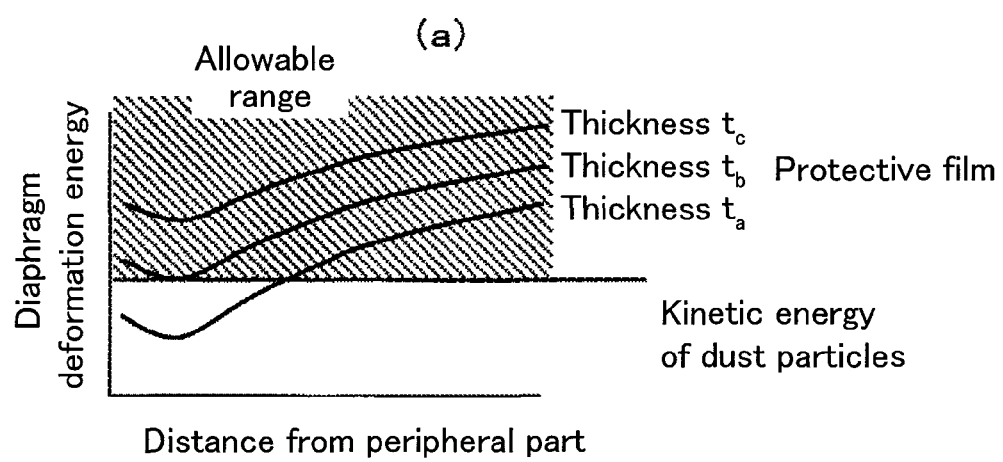
Figure 6:
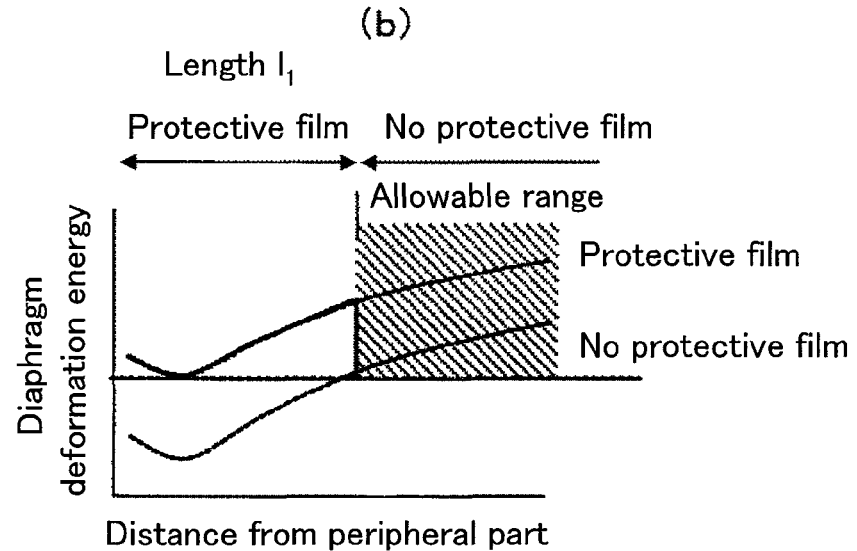
Figure 7:
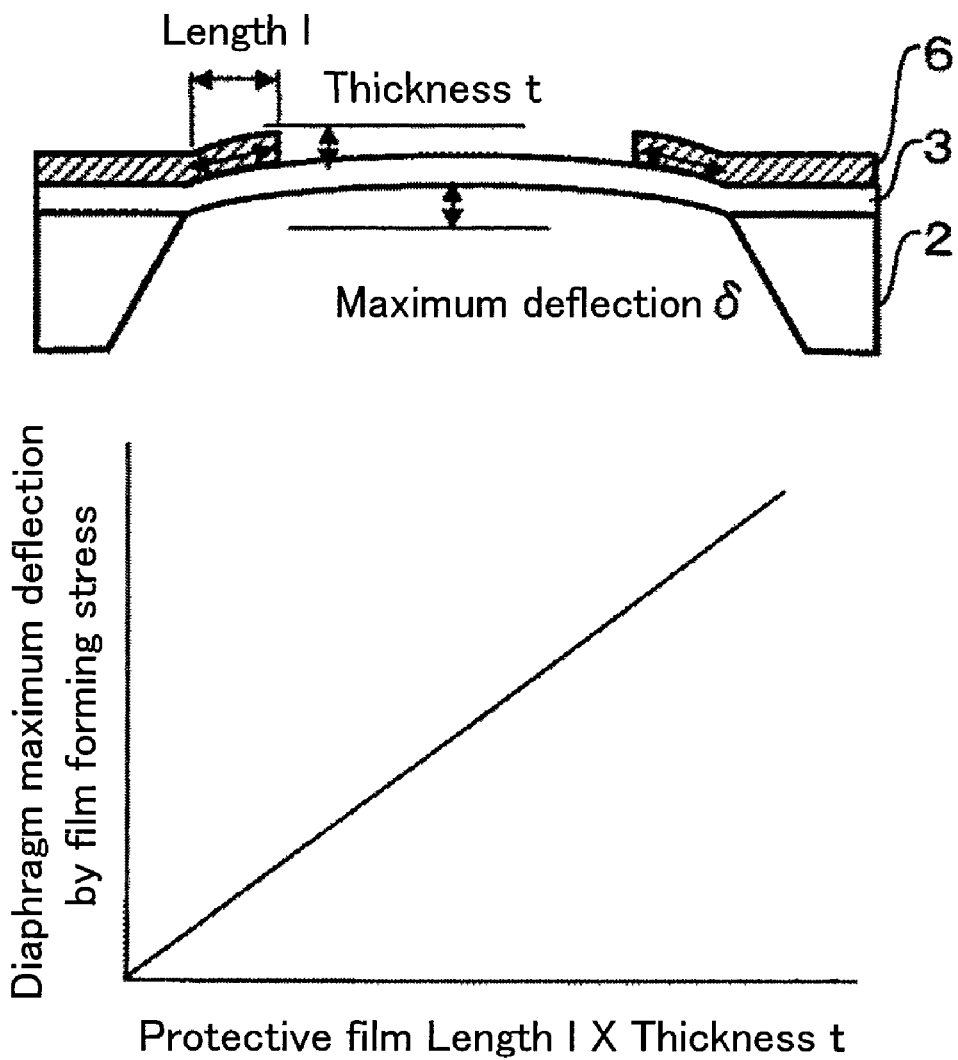
FIG. 7 is a view showing a relationship between maximum deflection of the diaphragm and the thickness of the protective film.

FIG. 7 shows the relationship between maximum deflection of the diaphragm section 30 due to the film forming stress of the protective film 6 and the length and thickness of the protective film 6. As the protective film 6 increases in thickness, the performance of the sensor changes, and the reliability thereof is lowered because of the influence of the film forming stress. For example, a polyimide protective film is formed by application and heating for dehydrating condensation. When the protective film 6 is returned to room temperature after heated, tensile film forming stress is produced in the protective film 6. Compared to the electrically and thermally insulating film constituting the diaphragm section 30, for example, such as a silicon dioxide ($SiO_2$) film, a silicon dioxide ($SiO_2$) reinforced by silicon nitride ($Si_3N_4$) film, the film forming stress of the polyimide protective film, for example, is small. However, the thickness of the protective film 6 is about one order larger than that of the insulating film, and furthermore, the protective film 6 is away from the bending neutral axis of the diaphragm section 30. Accordingly, the deflection of the diaphragm section 30 is affected by the film forming stress of the protective film 6. As shown in FIG. 6, as the length l or thickness t of the protective film 6 increases, the maximum deflection of the diaphragm section 30 increases.

Figure 8A:
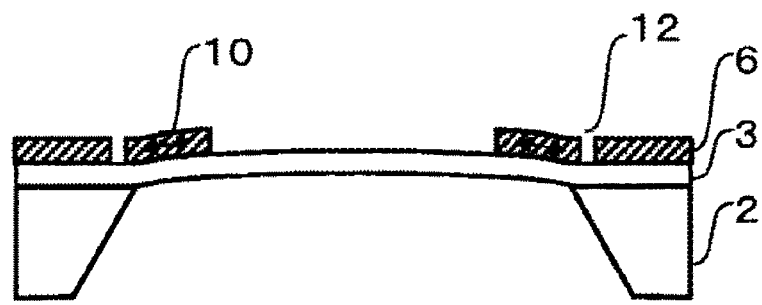
FIGS. 8A to 8C are views showing structures employed to reduce deflection of the diaphragm.
Figure 8B:
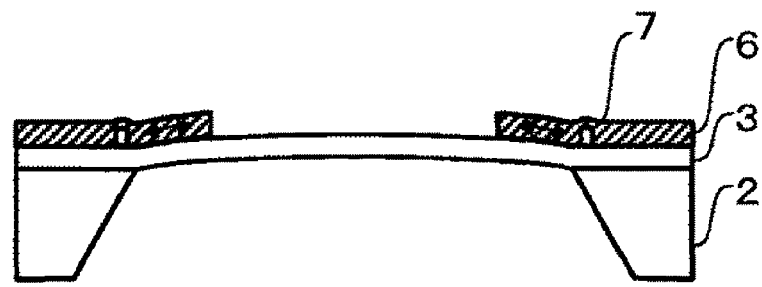
Figure 8C:
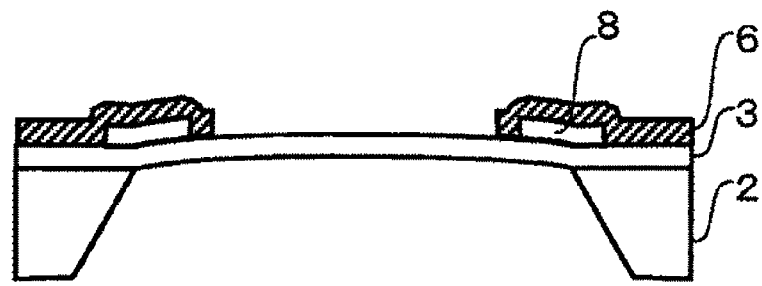

The deflection due to the tensile film forming stress can be reduced by inserting slits 12 in the protective film 6. As shown in FIG. 8A, the slits 12 should be formed outside of the diaphragm boundary (periphery 30a) above the semiconductor substrate 2. This is because if the slits 12 are formed inside of the boundary, the deformation energy of dust is reduced in the region around the slits 12. The slits 12 is produced by the same process as that of the region of the diaphragm section 30 where the protective film 6 is not formed, and the slits 12 can be produced together with the region. As shown in FIG. 8B, the narrow wire 7 instead of the slits 12 should be formed outside of the diaphragm boundary above the semiconductor substrate 2. It is known that the protective film 6 is thinner on the narrow wire 7 as shown in FIG. 5A. Alternatively, if wide wires 8 are formed across the diaphragm boundary as shown in FIG. 8C, the protective film 6 is not thin on the wide wires 8 as shown in FIG. 5B. The wide wires 8 have higher bending rigidity than the protective film 6 and therefore have an effect of reducing deflection due to the film forming stress of the protective film 6. Moreover, provision of the wide wires with compression film forming stress can reduce the deflection.

In the structure in which the peripheral part of the diaphragm section 30 of the electrical insulating film 3 is covered with the protective film 6 made of an organic material, there are structures where the resistor wires 4', 5a', and 5b' on the diaphragm section 30 cross the peripheral part of the diaphragm section 30. At the places where narrow wires, for example, such as the wires 5a' and 5b' of the resistance temperature detector cross the peripheral part of the diaphragm section 30, the dust impact resistance is lowered. Such lowering of the dust impact resistance is caused because the protective film 6 is made thinner on the narrow wires 5a' and 5b' and can absorb less kinetic energy of dust particles. By preventing the protective film 6 from being made thin on the narrow wires, the dust resistance performance of the diaphragm section 30 can be increased.

Figure 9:
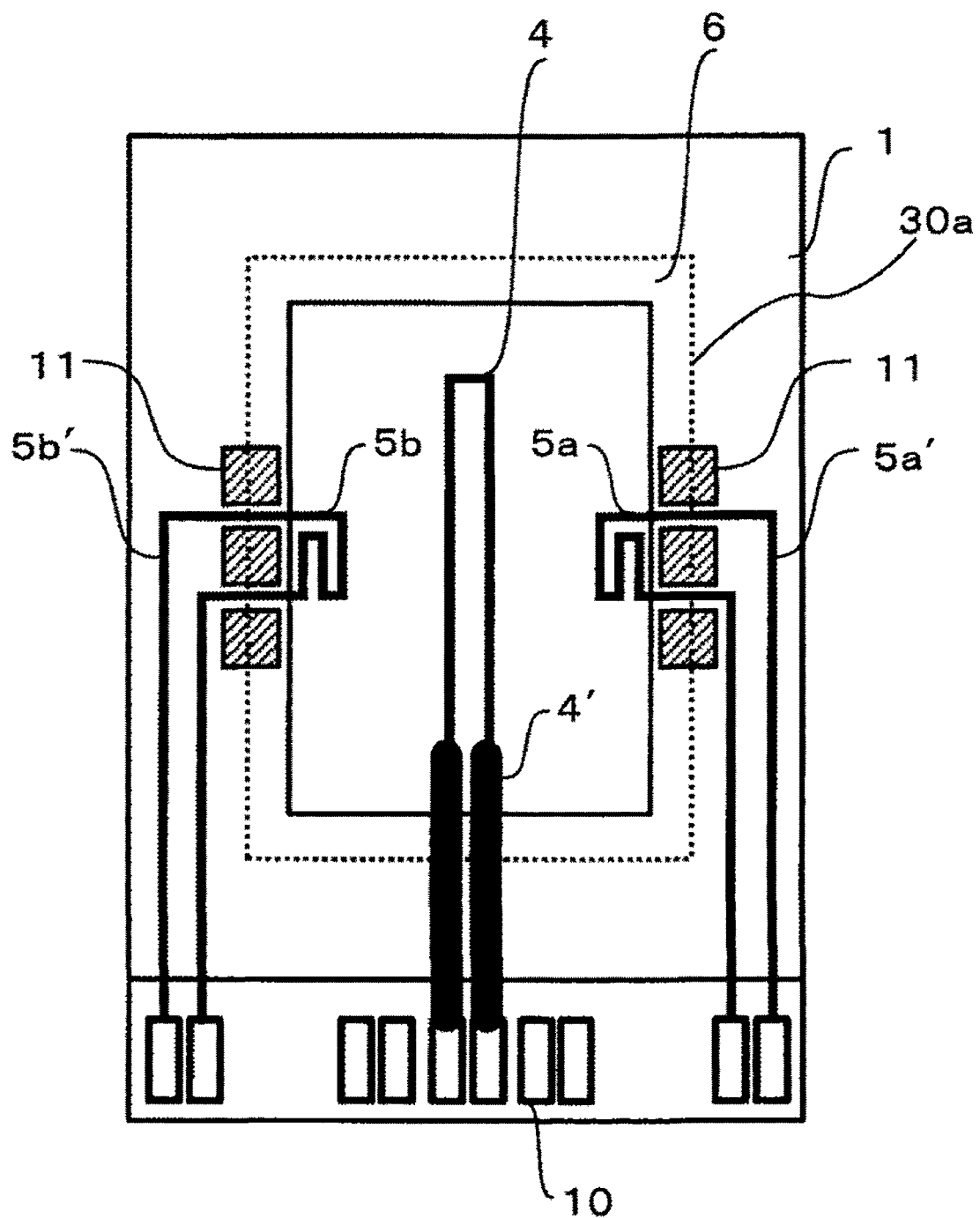
FIG. 9 is a schematic plan view of an embodiment of the thermal air flow meter to which the present invention is applied.
Figure 10:
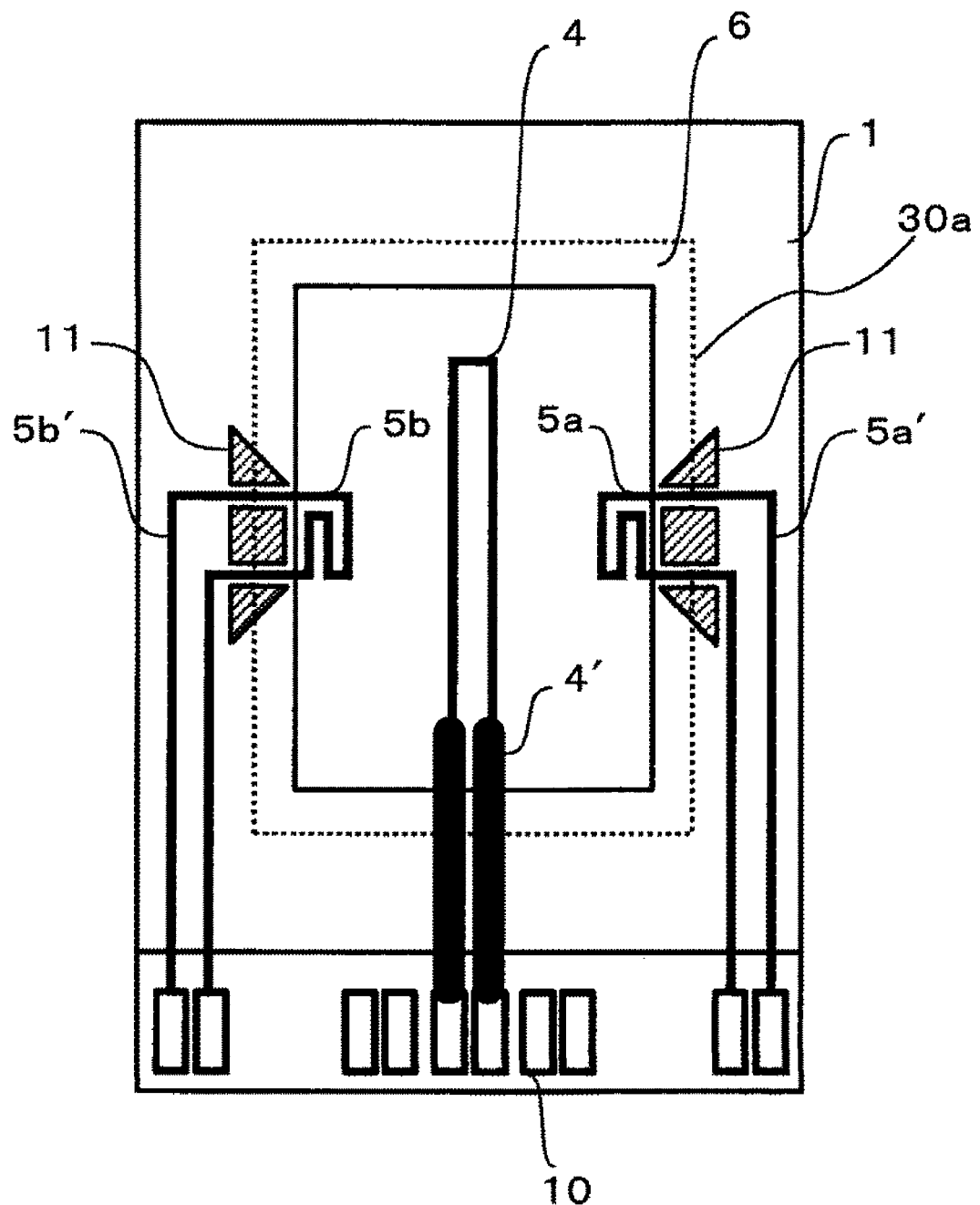
FIG. 10 is a schematic plan view of an embodiment of the thermal air flow meter to which the present invention is applied.
Figure 11:
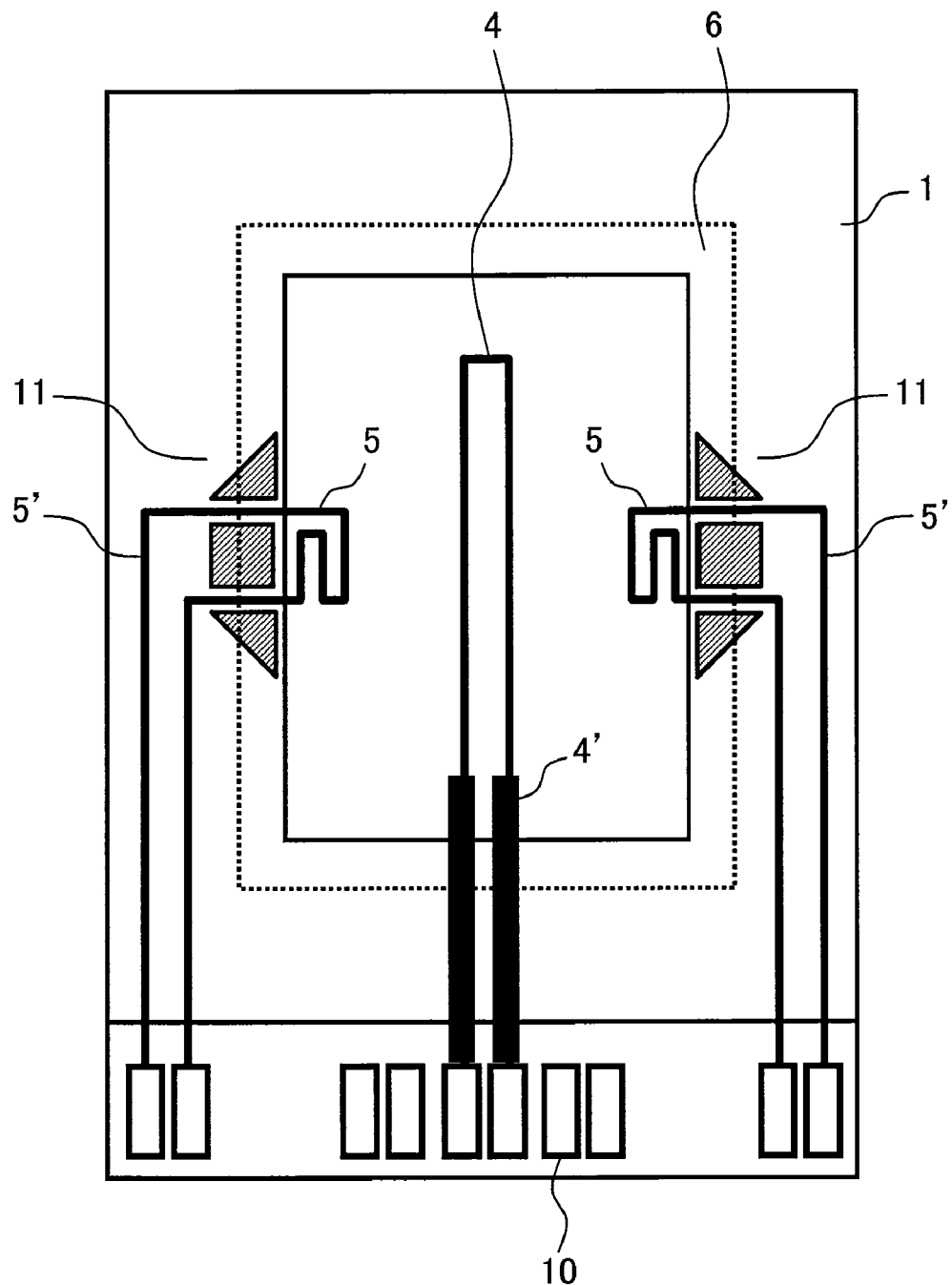
FIG. 11 is a schematic plan view of an embodiment of the thermal air flow meter to which the present invention is applied.
Figure 12:
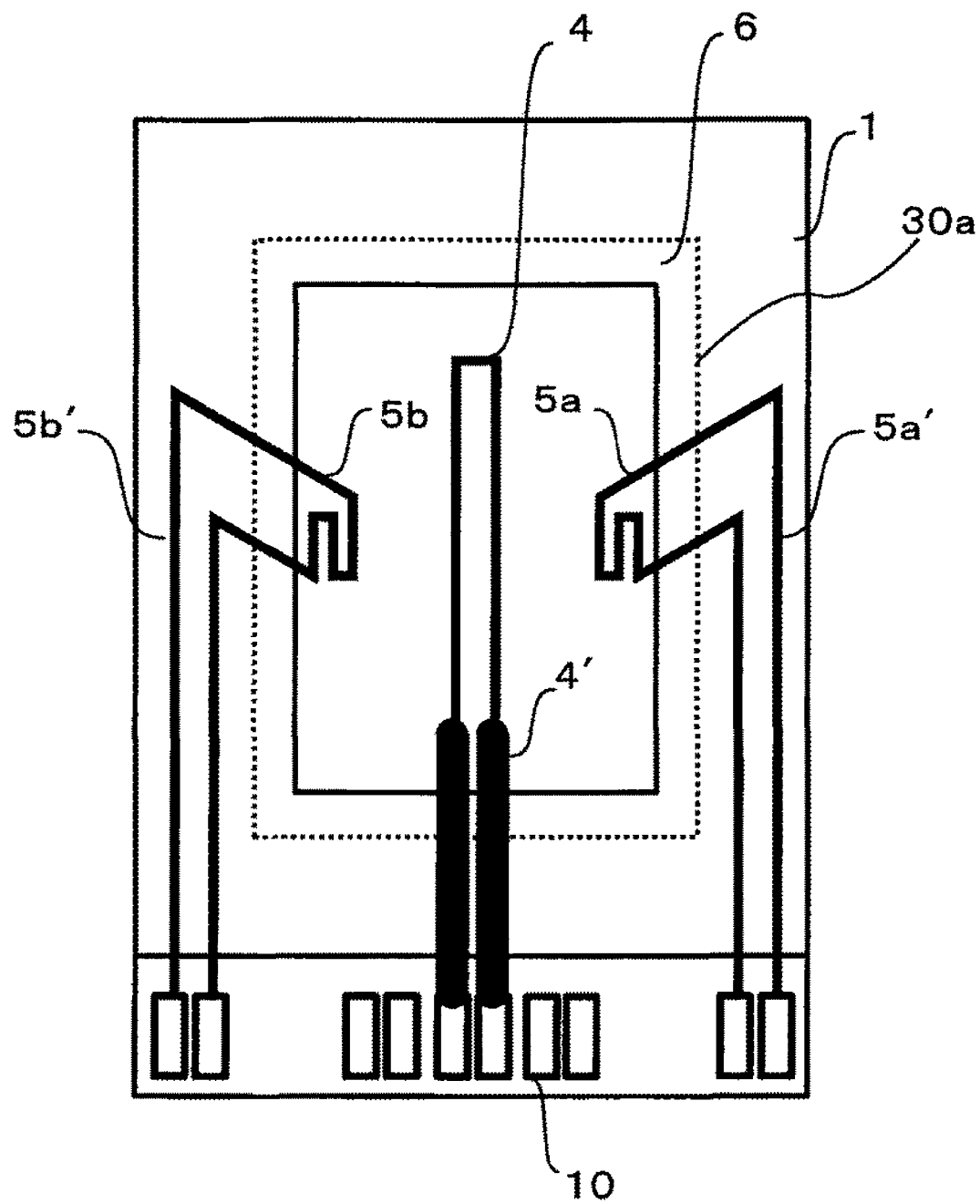
FIG. 12 is a schematic plan view of an embodiment of the thermal air flow meter to which the present invention is applied.

At least at the places which cross at least the periphery 30a of the diaphragm section 30 around the heating resistor wires 4' or resistance temperature detector wires 5a' and 5b', which are connected to the heating resistor body 4 and resistance temperature detector bodies 5a and 5b arranged in the region where the protective film 6 is not formed, dummy wide wires 11 which are not electrically connected are arranged side-by-side. This eliminates gaps between the wires, and the plurality of wires can be considered as a single wide wire. It is therefore possible to prevent the flow of varnish shown in FIG. 5B. The shape of the dummy wide wires 11 may be rectangular as shown in FIG. 9. Alternatively, as shown in FIG. 10, the dummy wide wires diagonally cross the diaphragm boundary. Such a shape has an effect on enhancing the resistance to dust. It is considered that as the angle between each wire and diaphragm boundary gets closer to 180 degrees, the specific nature of the structure and the stress concentration are reduced, thus increasing the resistance to dust. As shown in FIG. 11, dummy wide wires 11 that are at acute angles to the diaphragm boundary are provided, which has an effect of increasing the resistance to dust. As the angle between each wire and the diaphragm boundary gets close to 0 degree, the rigidity of the thin film diaphragm in the region between the wires and diaphragm boundary is increased. Accordingly, with this structure, the resistance to dust can be increased. Moreover, when the wires are configured to diagonally cross the diaphragm boundary, the same effects can be obtained even if dimensions are varied at forming the diaphragm section 30 by etching of the cavity 29. As shown in FIG. 12, the narrow wires such as the resistance temperature detector wires 5a' and 5b' may be arranged diagonally to the diaphragm boundary, which provide the similar effect. Furthermore, by diagonally arranging the wires in such a manner, the effect of increasing the apparent wire width with respect to the boundary of the diaphragm can be expected. Since it is made harder for varnish to flow down as the wires are wider as shown in FIG. 5, this structure can increase the resistance to dust of the diaphragm section 30.

In the aforementioned embodiment, the dummy wide wires 11 are arranged only in the vicinity of the narrow wires on which the protective film 6 is made thinner. The dummy wide wires 11 have effects of securing the thickness of the protective film 6 and reinforcing the peripheral part of the diaphragm section 30.

Figure 13:
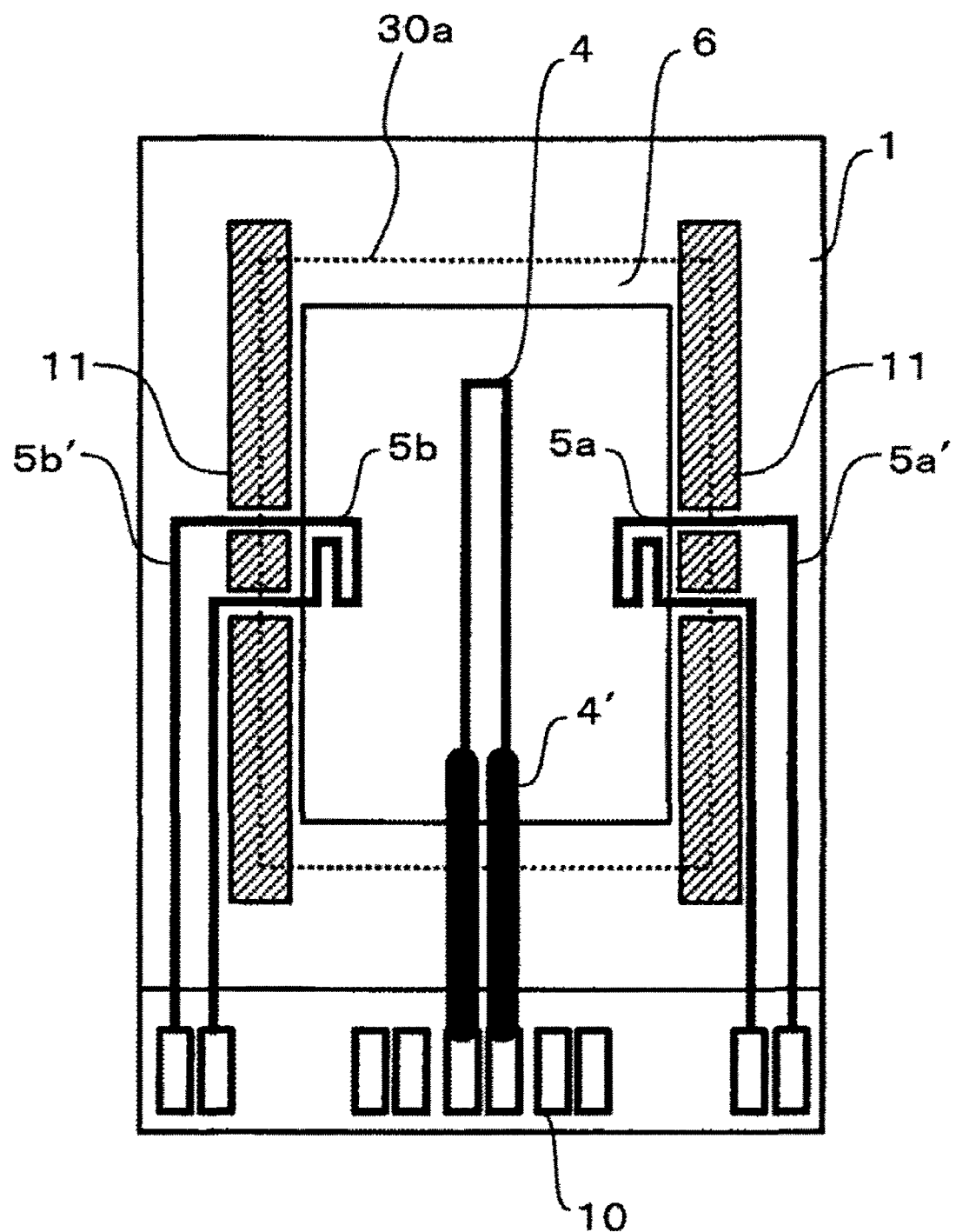
FIG. 13 is a schematic plan view of an embodiment of the thermal air flow meter to which the present invention is applied.
Figure 14:
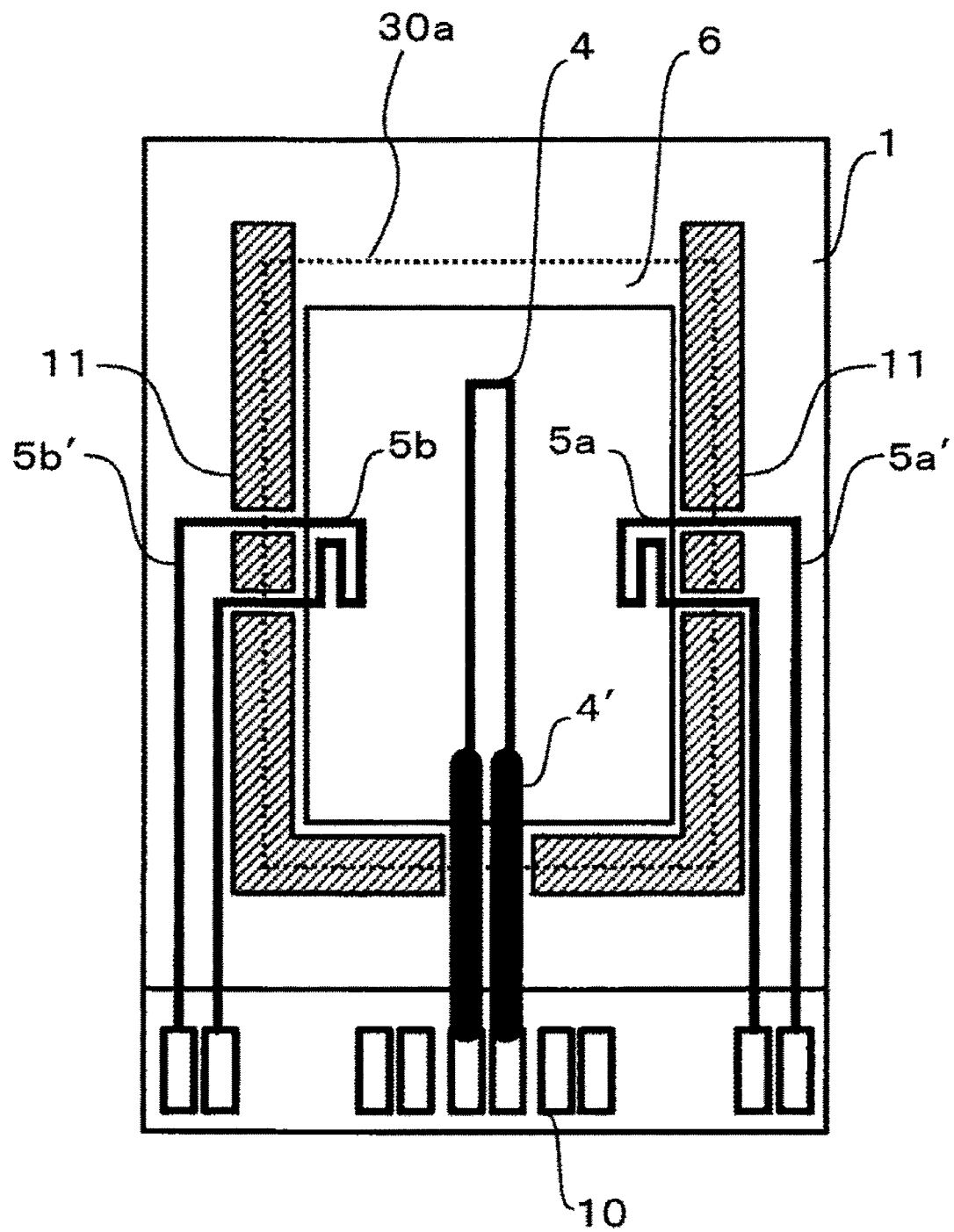
FIG. 14 is a schematic plan view of an embodiment of the thermal air flow meter to which the present invention is applied.
Figure 15:
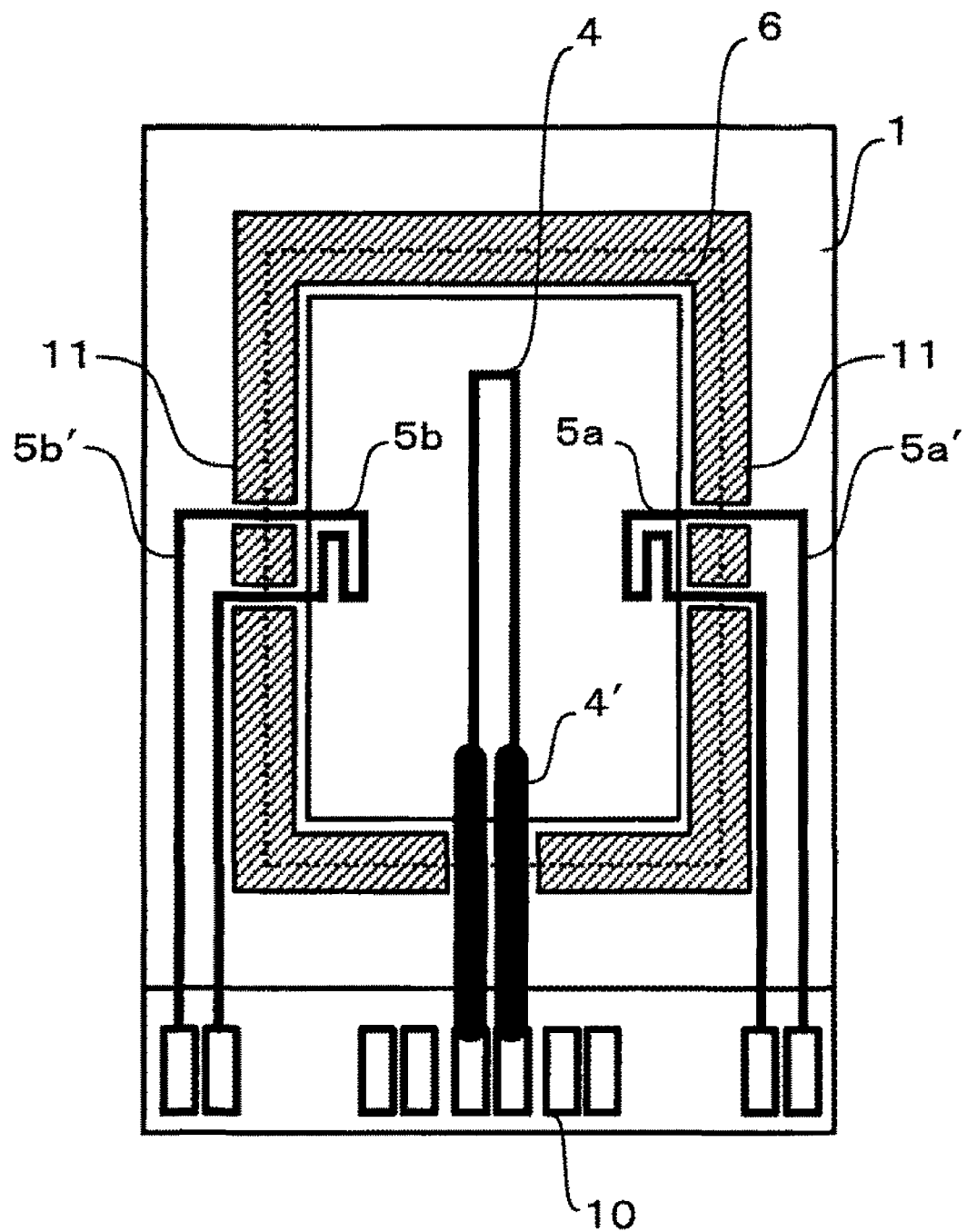
FIG. 15 is a schematic plan view of an embodiment of the thermal air flow meter to which the present invention is applied.

In FIG. 13, wide wires 11 not electrically connected are arranged on at least sides of the diaphragm section 30 which cross the heating resistor wires 4' or resistance temperature detector wires 5a' and 5b' connected to the heating resistor body 4 or resistance temperature detector bodies 5a and 5b arranged in the region where the protective film 6 is not formed. If the wide wires 11 are not arranged around the narrow wires but are formed along the sides of the diaphragm section 30 as shown in FIG. 13, the ends of each wide wire 11 are above the semiconductor substrate 2 outside of the diaphragm section 30. Accordingly, even if the protective film 6 is thin because of manufacturing variations, the deformation energy is not reduced. When the heating resistor wires 4' are comparatively narrow wires, for example, as shown in FIG. 14, wide wires should be arranged on three sides of the diaphragm section 30. Furthermore, as shown in FIG. 15, the dummy wide wires 11 not electrically connected are arranged along all the four sides (complete periphery) of the diaphragm section 30. The wide wires have rigidity one order higher than that of the protective film 6 and can enhance the resistance to dust. In this structure, the protective film 6 can be made thin, and there is an effect of preventing deflection of the diaphragm section 30 due to the aforementioned film forming stress of the protective film 6.

In the aforementioned embodiment, in order to prevent the protective film 6 from being made thinner on the narrow wires because of flow of varnish from the tops of the narrow wires, it is proposed that the dummy wide wires 11 are arranged side by side with the heating resistor wires 4' or resistance temperature detector wires 5a' and 5b'. However, the means for preventing varnish from flowing down from the tops of the narrow wires is not necessarily the dummy wide wires 11. For example, the dummy wide wires 11 may be made of a different material from that of the heating resistor wires 4' or resistance temperature detector wires 5a' and 5b' and is not necessarily electrically conductive. Accordingly, at the places crossing the peripheral part of the diaphragm section 30, film components protruding on the electrical insulating film 3 may be arranged side by side with the heating resistor wires 4' or with the resistance temperature detector wires 5a' and 5b'. At this time, the protruding film components are formed in the same layer in the film stack structure as the heating resistor wires 4' or resistance temperature detector wires 5a' and 5b'.

Since the dummy wide wires 11 are made of a conductive material, the dummy wide wires 11 are preferably arranged at a minute distance from the heating resistor wires 4' or resistance temperature detector wires 5a' and 5b'. Moreover, the dummy wide wires 11 can be arranged in contact with the heating resistor wires 4' or resistance temperature detector wires 5a' and 5b' if the dummy wide wires 11 are made of a different material from the heating resistor wires 4' or resistance temperature detector wires 5a' and 5b'.

If the protruded film components are dummy wires made of a same material as that of the heating resistor wires 4' or resistance temperature detector wires 5a' and 5b', the protruded film component can be formed by the same process as the heating resistor wires 4' or resistance temperature detector wires 5a' and 5b'. This can increase the accuracy of the positions and shape and facilitate the manufacturing thereof, thus reducing the manufacturing cost.

Each dummy wire is a film which is made of a conductive material or a same material as that of the heating resistor wires 4' or resistance temperature detector wires 5a' and 5b', and is not electrically connected. It can be determined whether the wire is electrically connected based on whether current flows therethrough or any electric signal is extracted therefrom. Specifically, even if the dummy wire is connected to a power line, the wire is determined not to be electrically connected in the structures where the circuit including the dummy wire is not closed and does not allow current to flow therethrough or where any electric signal cannot be extracted.

Second Embodiment

Figure 16:
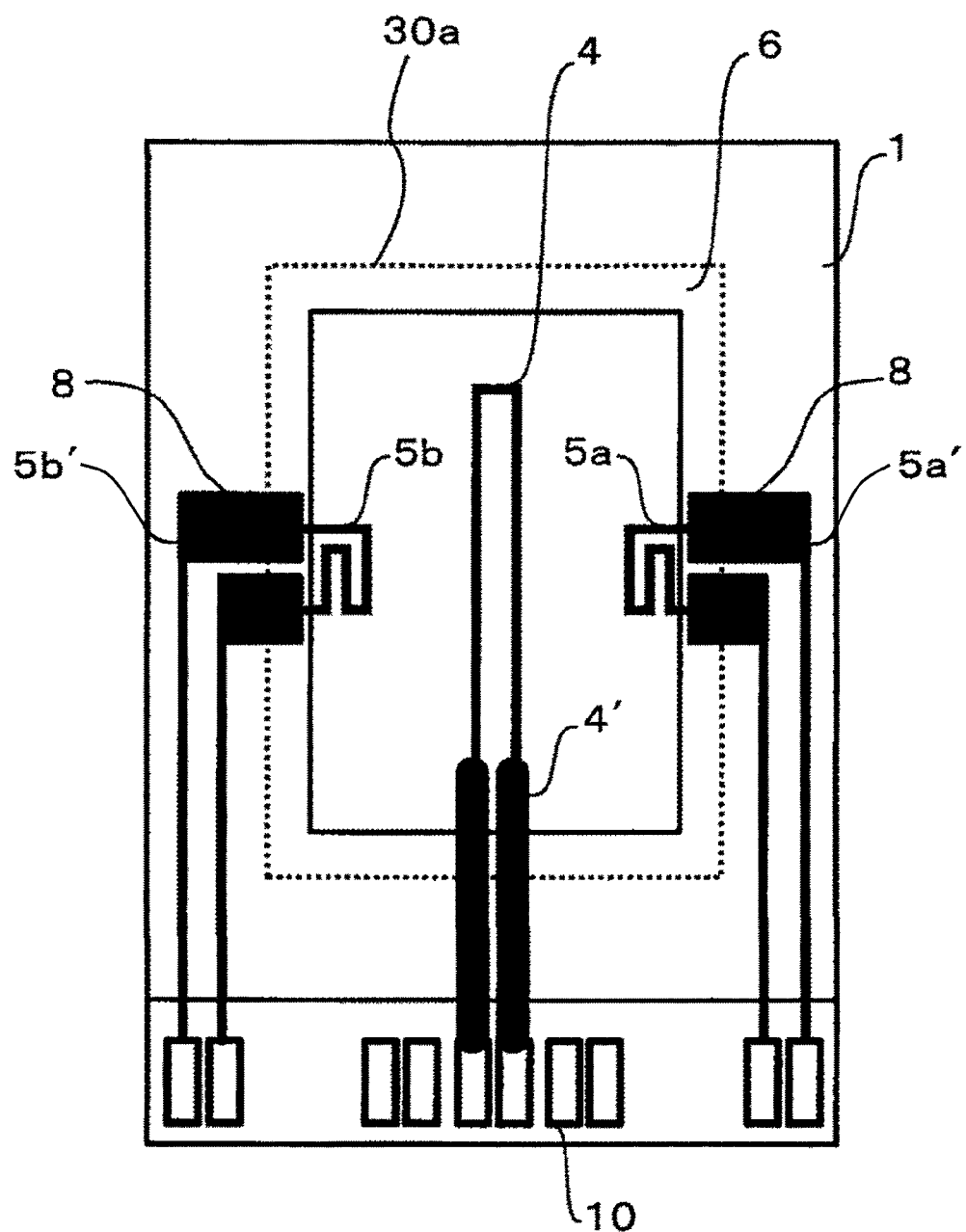
FIG. 16 is a schematic plan view of an embodiment of the thermal air flow meter to which the present invention is applied.

FIG. 16 shows another embodiment of the present invention. In this embodiment, instead of using the dummy wide wires 11, the heating resistor wires 4' or resistance temperature detector wires 5a' and 5b' are partially widened to provide wide wires 8, thus obtaining a similar effect to the first embodiment. Generally, the width of the heating resistor wires 4' is comparatively wide to reduce the resistance value.

Accordingly, widening the temperature measuring resistance wires 5a' and 5b' is especially effective.

Figure 17:
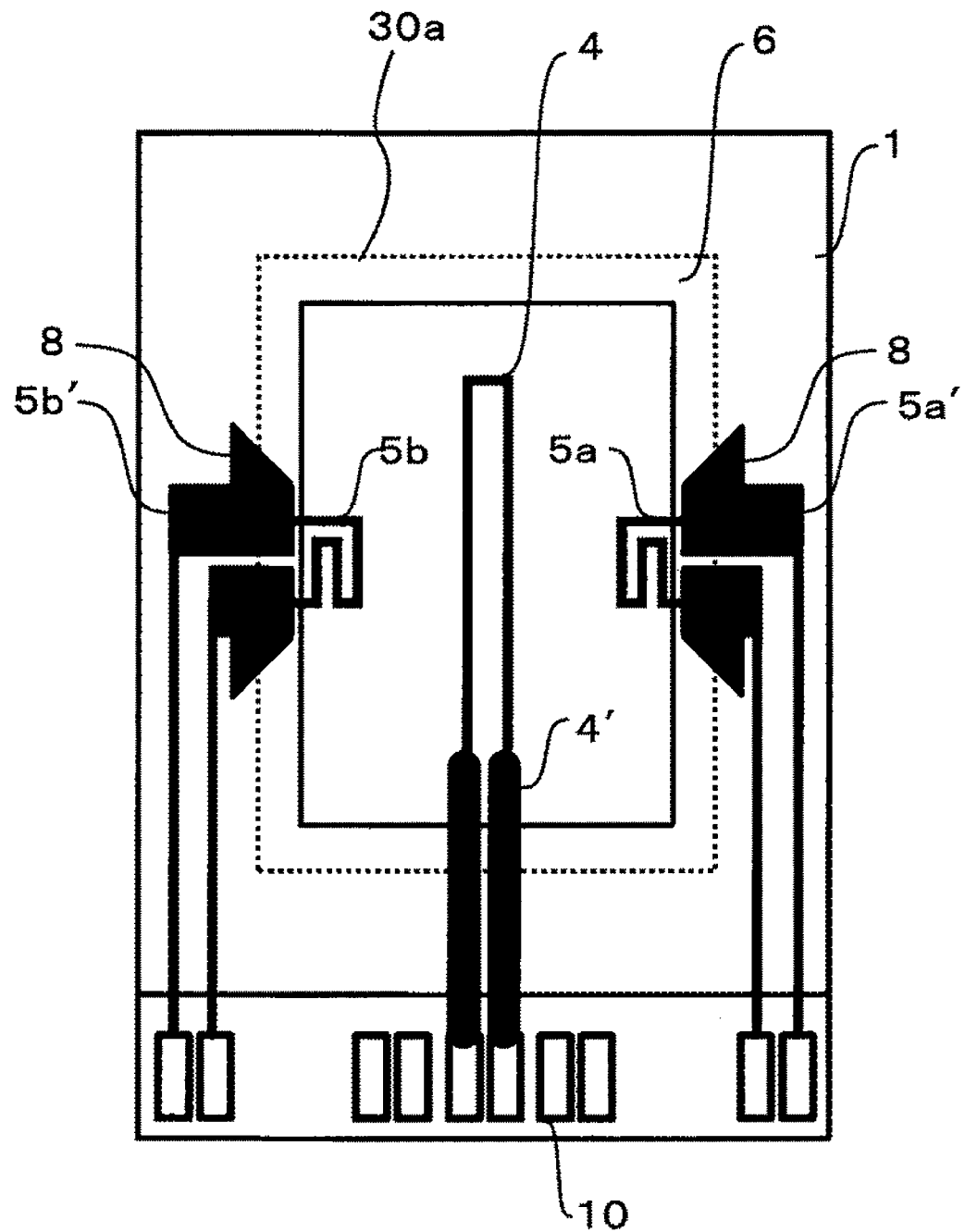
FIG. 17 is a schematic plan view of an embodiment of the thermal air flow meter to which the present invention is applied.
Figure 18:
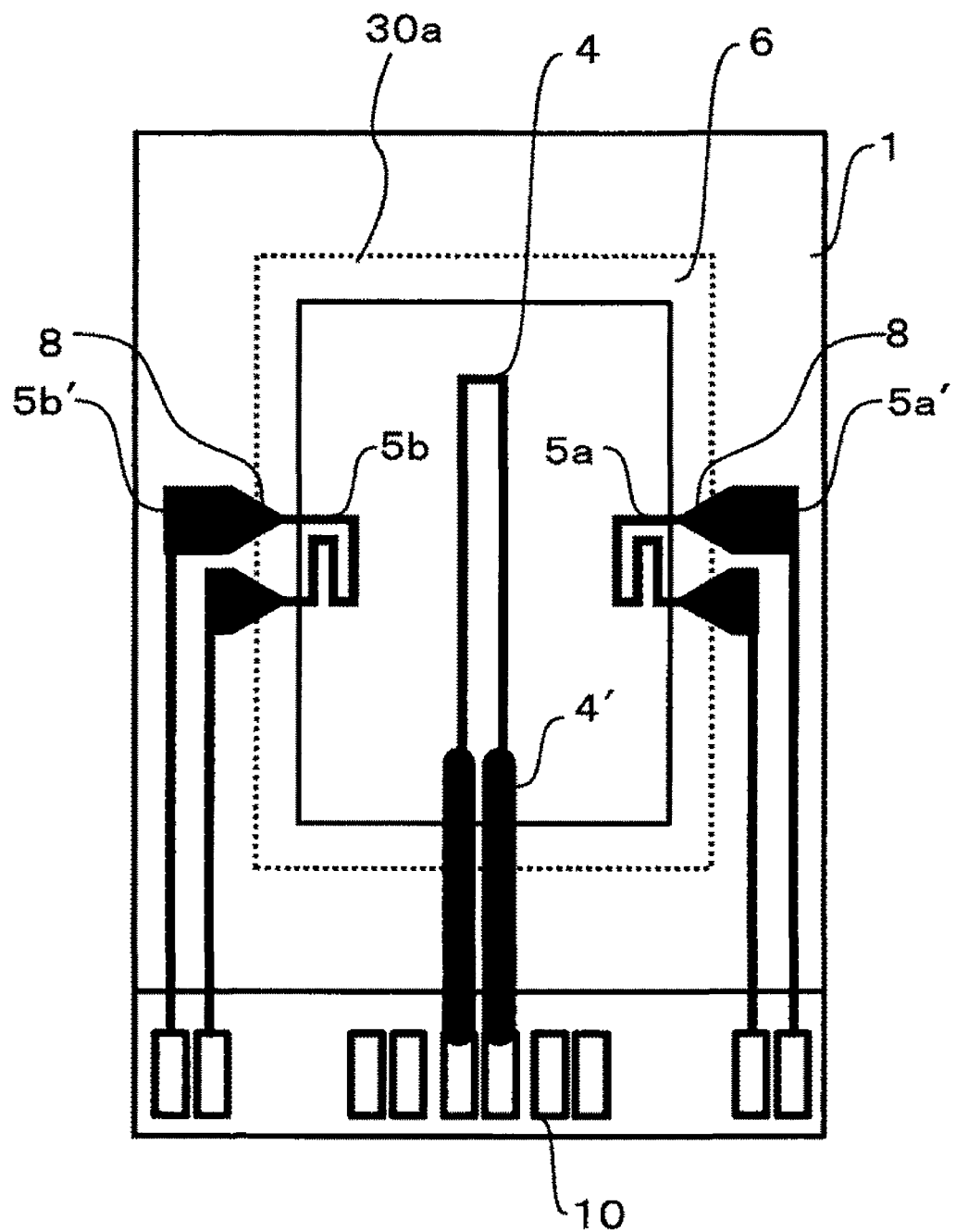
FIG. 18 is a schematic plan view of an embodiment of the thermal air flow meter to which the present invention is applied.
Figure 19:
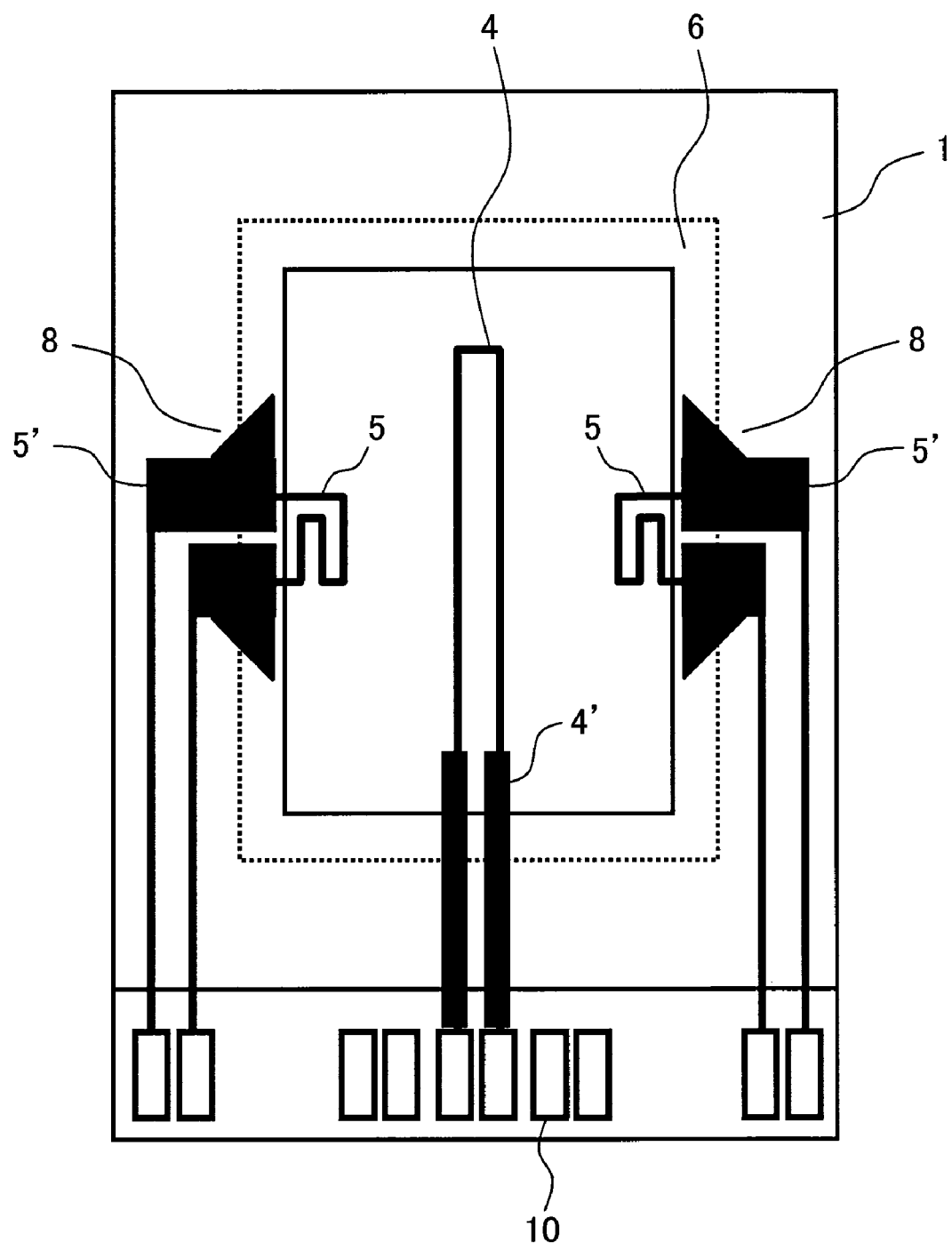
FIG. 19 is a schematic plan view of an embodiment of the thermal air flow meter to which the present invention is applied.
Figure 20:
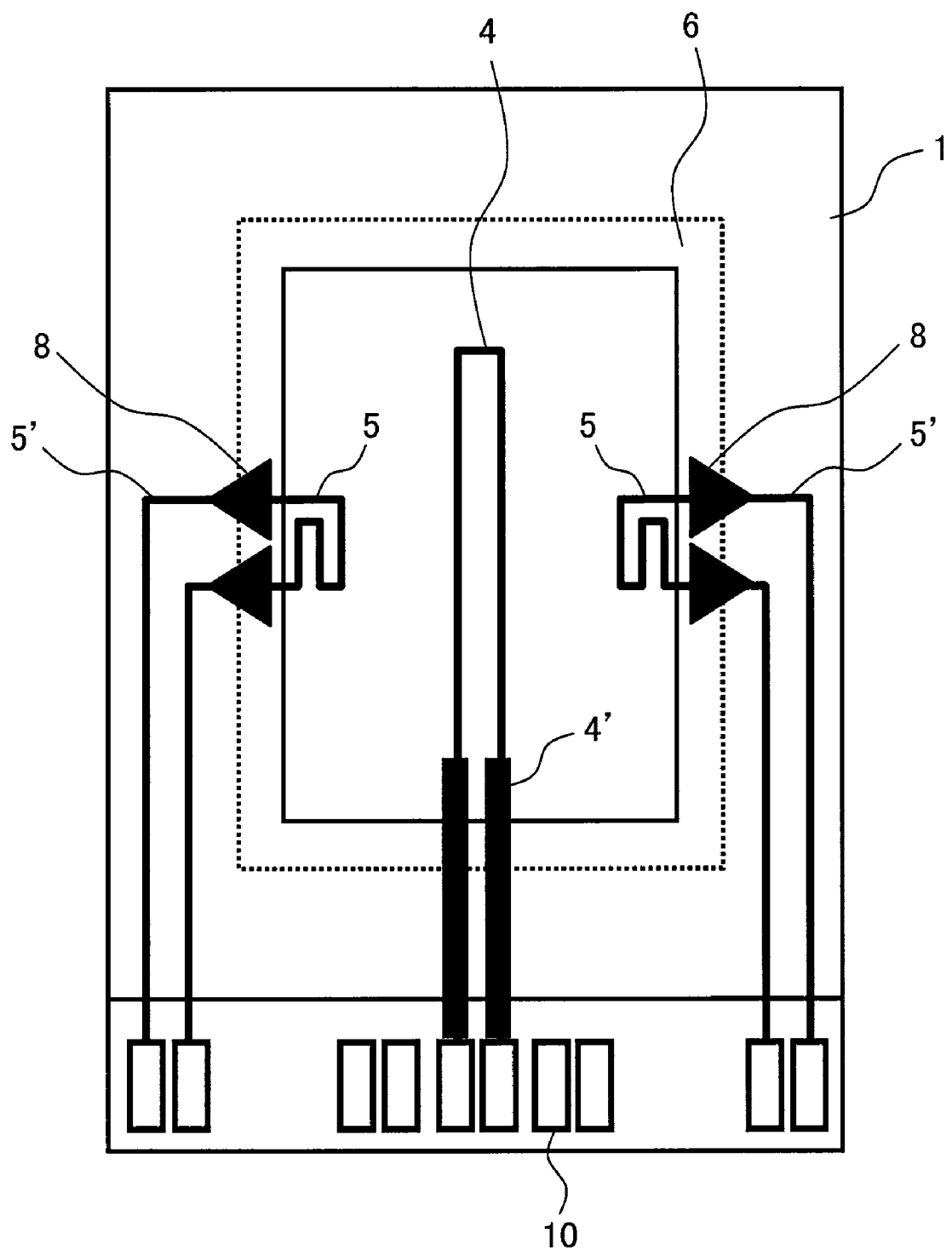
FIG. 20 is a schematic plan view of an embodiment of the thermal air flow meter to which the present invention is applied.
Figure 21:
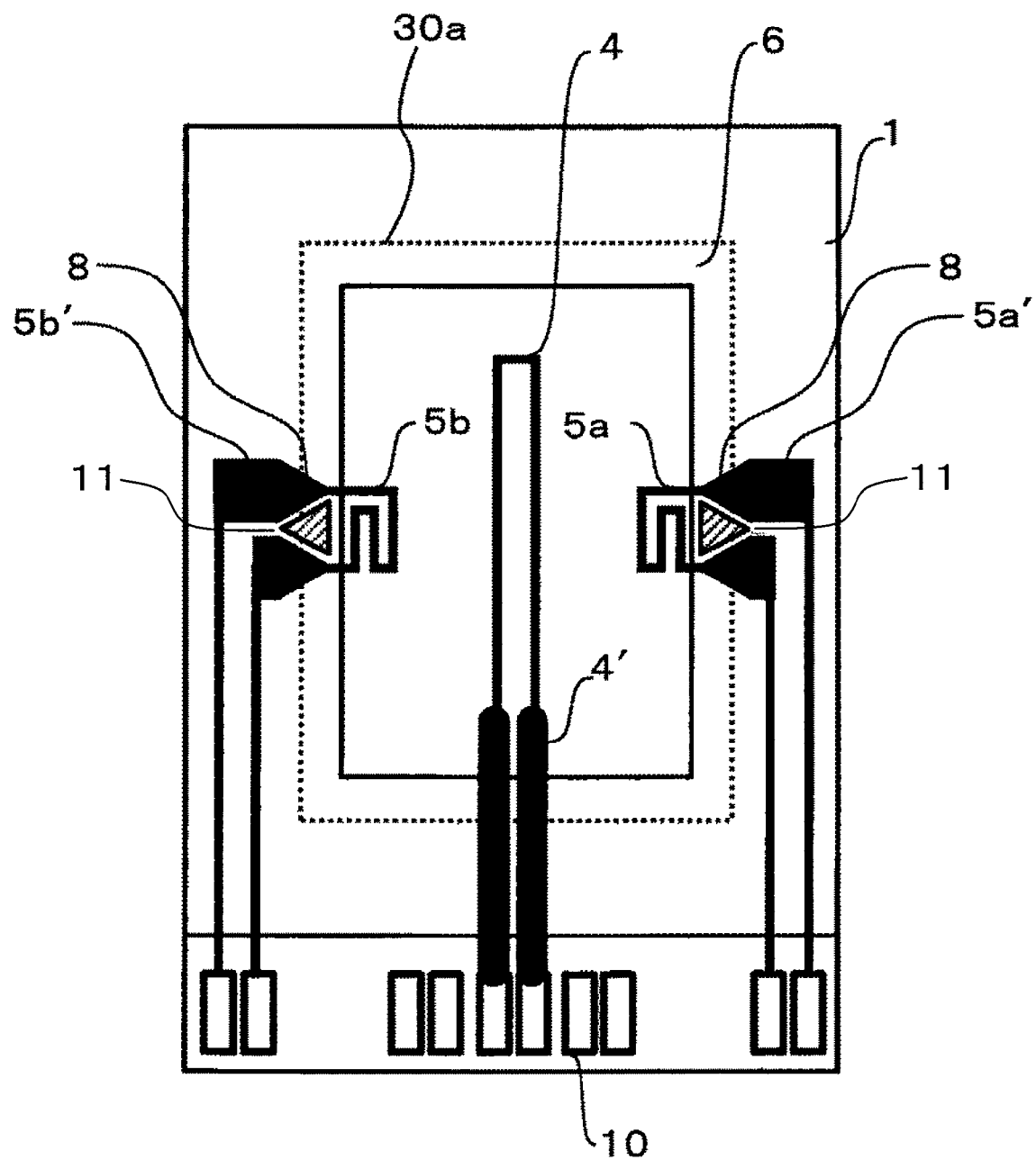
FIG. 21 is a schematic plan view of an embodiment of the thermal air flow meter to which the present invention is applied.

Since the thermal air flow meter measures the flow rate using changes in resistance value of the resistance temperature detector body 5, it is necessary to know an accurate resistance value. The wide wire 8 is sufficiently shorter than the entire length of the resistance temperature detector wires 5a' and 5b', so that the effect caused by the wide wire 8 can be neglected. Moreover, the widened part of each wire may be rectangular as shown in FIG. 16 or may be arranged to diagonally cross the diaphragm boundary as shown in FIGS. 17 and 18. This has an effect of enhancing the resistance to dust. It is considered that as the angle between each wire and diaphragm boundary gets closer to 180 degrees, the specific nature of the structure and the stress concentration are reduced, thus increasing the resistance to dust. Moreover, as shown in FIGS. 19 and 20, the partially widened wide wires 8 are arranged at acute angles to the diaphragm boundary to obtain an effect of increasing the resistance to dust. As the angle between each wire and the diaphragm boundary gets close to 0 degree, the rigidity of the thin film diaphragm in the region between the wires and diaphragm boundary is increased. It can be therefore considered that the resistance to dust is increased with this structure. Moreover, in FIGS. 17 and 19, a pair of wires partially widened have a shape in which each of the angles between the diaphragm boundary and the inner edges of the wires is 90 degrees and each of the angles between the diaphragm boundary and the outer edges of the wires opposite to the inner edges is an acute or obtuse angle. The pair of wires can be considered as a single wide wire. Since it is made harder for varnish to flow down from the top of the wires as the wires are wider as shown in FIG. 5. Accordingly, this structure can increase the resistance to dust of the diaphragm section 30. Moreover, when the wires are configured to diagonally cross the diaphragm boundary, the same effects can be obtained even if dimensions are varied at forming the diaphragm section 30 by etching of the cavity 29. Both the dummy wide wires 11 and wide wires 8 may be used as shown in FIG. 21.

In this embodiment, proper one of the organic material constituting the protective film 6 is polyimide. However, the same effect can be obtained by the protective film 6 of another organic material, such as, polyamide-imide, polyphenylene sulfide, phenol resin, epoxy resin, polysulfone, polyamide, polypropyrene, or the like. However, the organic material used as the protective film 15 should be properly selected in the light of the environmental conditions to which the measuring element 1 is exposed, temperature of the resistors, a manufacturing method and required film thickness of the protective film 6, and the like. Furthermore, in this embodiment, the description is given of the thermal air flow meter which is provided to the electronic controlled injector of the internal combustion engine of automobiles and the like for measuring intake air mass. However, the present invention is not limited to this and can be applied to thermal air flow meters for various uses.

What is claimed is:

1. A thermal air flow meter, comprising:
   a semiconductor substrate;
   an electrical insulating film formed on the semiconductor substrate; and
   a heating resistor and a resistance temperature detector formed on the electrical insulating film, wherein
   the semiconductor substrate is partially removed to form a cavity in a region of the semiconductor substrate where bodies of the heating resistor and resistance temperature detector are formed, and thus the region having the heating resistor body and the resistance temperature detector body formed therein is formed into a diaphragm section,
   a protective film is formed on and outside a peripheral part of the diaphragm section, and is not formed in a region of the diaphragm section where the heating resistor body and the resistance temperature detector body are formed, and
   at a place where a heating resistor wire connected to the heating resistor body or a resistance temperature detector wire connected to the resistance temperature detector body crosses the peripheral part of the diaphragm section, a film component protruding from the electrical insulating film is arranged side by side with the heating resistor wire or with the resistance temperature detector wire.

2. The thermal air flow meter according to claim 1, wherein the film component is a wire which is made of a same material as that of the heating resistor wire or of the resistance temperature detector wire and which is not electrically connected.

3. The thermal air flow meter according to claim 2, wherein width of the wire which is arranged side by side with the heating resistor wire or with the resistance temperature detector wire and which is not electrically connected is wider than width of the heating resistor wire or of the resistance temperature detector wire adjacent to the wire.

4. The thermal air flow meter according to claim 1, wherein wires not electrically connected are formed on at least one of sides of the diaphragm section, the at least one side including the place where the heating resistor wire or the resistance temperature detector wire crosses the peripheral part of the diaphragm section, the wires not electrically connected being formed entirely on the at least one side excluding part where at least the heating resistor wire and the resistance temperature detector wire are formed.

5. The thermal air flow meter according to claim 2, wherein the wire not electrically connected is formed to diagonally cross the peripheral part of the diaphragm section.

6. The thermal air flow meter according to claim 1, wherein outside a periphery of the diaphragm section in a region where the protective film is formed, a slit is formed in the protective film along the periphery of the diaphragm section.

7. The thermal air flow meter according to claim 1, wherein outside a periphery of the diaphragm section in a region where the protective film is formed, a narrow wire not electrically connected is formed along the periphery of the diaphragm section.

8. A thermal air flow meter, comprising:
   a semiconductor substrate;
   an electrical insulating film formed on the semiconductor substrate; and
   a heating resistor and a resistance temperature detector formed on the electrical insulating film, wherein
   the semiconductor substrate is partially removed to form a cavity in a region of the semiconductor substrate where bodies of the heating resistor and resistance temperature detector are formed, and thus the region having the heating resistor body and the resistance temperature detector body formed therein is formed into a diaphragm section,
   a protective film is formed on and outside a peripheral part of the diaphragm section, and is not formed in a region of the diaphragm section where the heating resistor body and the resistance temperature detector body are formed, and
   at a place where a resistance temperature detector wire connected to the resistance temperature detector body crosses the peripheral part of the diaphragm section, width of the resistance temperature detector wire is wider than the other part of the resistance temperature detector wire.

9. A thermal air flow meter, comprising:

a semiconductor substrate;

an electrical insulating film formed on the semiconductor substrate; and a heating resistor and a resistance temperature detector formed on the electrical insulating film, wherein the semiconductor substrate is partially removed to form a cavity in a region of the semiconductor substrate where bodies of the heating resistor and resistance temperature detector are formed, and thus the region having the heating resistor body and the resistance temperature detector body formed therein is formed into a diaphragm section, a protective film is formed on and outside a peripheral part of the diaphragm section, and is not formed in a region of the diaphragm section where the heating resistor body and the resistance temperature detector body are formed, and at a place where a heating resistor wire connected to the heating resistor body or a resistance temperature detector wire connected to the resistance temperature detector body crosses the periphery of the diaphragm section, the heating resistor wire or the resistance temperature detector wire is formed diagonally to the periphery of the diaphragm section.

10. A thermal air flow meter, comprising:

a semiconductor substrate;

an electrical insulating film formed on the semiconductor substrate; and a heating resistor and a resistance temperature detector formed on the electrical insulating film, wherein the semiconductor substrate is partially removed to form a cavity in a region of the semiconductor substrate where bodies of the heating resistor and resistance temperature detector are formed, and thus the region having the heating resistor body and the resistance temperature detector body formed therein is formed into a diaphragm section, a protective film is formed to extend from outside the diaphragm section across a periphery of the diaphragm section to inside the diaphragm section, and is not formed in a region of the diaphragm section where the heating resistor body and the resistance temperature detector body are formed, and length from the periphery of the diaphragm section to the end of the protective film which is formed within the diaphragm section is set so that a minimum value of deformation energy in a region where the protective film of the diaphragm section is not formed is more than a minimum value of the deformation energy in the peripheral part of the diaphragm section where the protective film is formed.

* * * * *